(12) United States Patent
Hillier

(10) Patent No.: US 7,548,152 B2
(45) Date of Patent: Jun. 16, 2009

(54) RFID TRANSPONDER INFORMATION SECURITY METHODS SYSTEMS AND DEVICES

(75) Inventor: Stephen Hillier, Ottawa (CA)

(73) Assignee: Entrust Limited, Ottawa, Ontario (CA)

( * ) Notice: Subject to any disclaimer, the term of this patent is extended or adjusted under 35 U.S.C. 154(b) by 583 days.

(21) Appl. No.: 10/960,115

(22) Filed: Oct. 8, 2004

(65) Prior Publication Data

US 2006/0077034 A1 Apr. 13, 2006

(51) Int. Cl.
*H04Q 1/00* (2006.01)
(52) U.S. Cl. .............. 340/5.61; 340/5.26; 340/10.1; 380/270; 713/166
(58) Field of Classification Search ........... 340/5.61, 340/5.26, 5.1, 825.69, 10.1, 10.5, 10.51; 235/382.5; 380/270; 713/168
See application file for complete search history.

(56) References Cited

U.S. PATENT DOCUMENTS

| | | | | |
|---|---|---|---|---|
| 5,481,613 A | | 1/1996 | Ford et al. | 380/30 |
| 5,629,981 A * | | 5/1997 | Nerlikar | 713/168 |
| 6,055,636 A | | 4/2000 | Hillier et al. | 713/200 |
| 6,092,201 A | | 7/2000 | Turnbull et al. | 713/201 |
| 6,130,623 A * | | 10/2000 | MacLellan et al. | 340/5.1 |
| 6,202,157 B1 | | 3/2001 | Brownlie et al. | 713/201 |
| 6,229,894 B1 * | | 5/2001 | Van Oorschot et al. | 713/150 |
| 6,393,568 B1 * | | 5/2002 | Ranger et al. | 713/188 |
| 6,724,895 B1 * | | 4/2004 | Turner et al. | 713/168 |
| 6,732,277 B1 | | 5/2004 | Vandergeest et al. | 713/201 |
| 6,747,546 B1 * | | 6/2004 | Hikita et al. | 340/10.31 |
| 6,842,116 B2 * | | 1/2005 | Hum et al. | 340/573.4 |
| 6,957,333 B2 * | | 10/2005 | He | 713/168 |
| 7,133,659 B2 * | | 11/2006 | Zalewski et al. | 455/403 |
| 7,154,375 B2 * | | 12/2006 | Beenau et al. | 340/3.53 |
| 2002/0005774 A1 | | 1/2002 | Rudolph et al. | |
| 2002/0087867 A1 * | | 7/2002 | Oberle et al. | 713/183 |
| 2002/0109580 A1 * | | 8/2002 | Shreve et al. | 340/5.61 |
| 2003/0093663 A1 | | 5/2003 | Walker | |
| 2004/0159700 A1 | | 8/2004 | Khan et al. | |
| 2004/0180646 A1 | | 9/2004 | Donley et al. | |
| 2005/0017844 A1 * | | 1/2005 | Cole | 340/10.1 |
| 2005/0036620 A1 * | | 2/2005 | Casden et al. | 380/259 |

OTHER PUBLICATIONS

"Cryptographic Approach to "Privacy-Friendly" Tags"; Miyako Ohkubo, Koutarou Susuki and Shingo Kinoshita; NTT Laboratories; Nippon Telegraph and Telephone Corporation.

\* cited by examiner

*Primary Examiner*—Edwin C Holloway, III

(57) ABSTRACT

Methods, systems and devices for providing RFID system security are provided that involve cryptographically encrypting data on a transponder and managing the release of the decryption information, decryption keys, or the data itself to a transceiver having a transaction with the transponder.

45 Claims, 15 Drawing Sheets

| POLICY SERVICE RULES | | | |
|---|---|---|---|
| | DATA_A | DATA_B | DATA_C |
| TXA | READ, WRITE, MODIFY, APPEND | NOTHING | NOTHING |
| TXB | READ, APPEND | READ, WRITE, MODIFY, APPEND | NOTHING |
| TXC | NOTHING | NOTHING | READ, WRITE, MODIFY, APPEND |

FIG. 9

RFID TRANSPONDER INFORMATION SECURITY METHODS SYSTEMS AND DEVICES

FIELD OF THE INVENTION

The invention relates to RFID systems and more particularly to RFID transponder information security.

BACKGROUND OF THE INVENTION

Radio Frequency Identification (RFID) systems are comprised of three main components, an RFID tag or transponder, an RFID reader or transceiver and an RFID processing infrastructure. An RFID transponder is a device having a microchip that stores data and is capable of radio frequency communication. An RFID transceiver is a device that is used to read and/or write data to an RFID transponder using radio frequency communication. The RFID processing infrastructure is a processing subsystem which makes use of the transponder data obtained by the transceivers of the RFID system.

RFID transponders range in capability from simple passive devices that carry minimal identifier data to active devices with larger storage and computing capability. Both passive and active transponders communicate to a transceiver when they are interrogated by the transceiver. RFID transponders are often affixed to objects, such as consumer goods, and when used in combination with the transceivers and the RFID infrastructure allow for the storage and retrieval of data associated with those objects.

A major security issue arises in RFID based systems due to the storage and retrieval of RFID transponder data occurring through the use of radio transmissions and involving no physical contact. Utilization of radio transmissions allows communication signals from an RFID transponder to be accessed by any transceiver within the vicinity of the transponder. Currently there is no way to track or prevent these accesses. As the use of RFID transponders becomes more prevalent in the retail industry as well as other consumer oriented industries, this ability to easily access transponders will become a major privacy and security concern.

Given possible access to communication signals from a transponder, there are two main areas of focus for security measures in RFID systems. The first area of focus is the prevention of access to data or capability of an RFID transponder from unauthorized RFID transceivers. The second area of focus is the prevention of unauthorized listeners from discovering the identification (RFID) associated with an RFID transponder.

There are several known security mechanisms for addressing both of these aspects of RFID system security. These security mechanisms were developed based upon some assumptions about the operational constraints of a viable RFID system.

One assumption is that RFID transponders need to be simple and cheap and hence tend to be passive, provide simply read-only capability, and contain only a few hundred bits of storage.

Another assumption is that low cost RFID transponders have limited processing capability.

Another assumption is that the operating range of a passive RFID transponder is constrained to a backward channel range of a few meters. The RFID transceivers, however, have a significantly larger broadcast range, the forward channel range, that may be monitored from as far away as 100 meters.

Some examples of security mechanisms include hash-based access control, randomized access control, Silent Tree Walking, Blocker tags, and maintaining sensitive data at a control location in the RFID infrastructure.

Hash-Based access control requires support for hashing on the RFID transponder and also the secure distribution of a secret 'key' to allow authorized transceivers to unlock the transponder. Once unlocked, the transponder will then allow the transceiver access to all of its functionality. This access control method is susceptible to two kinds of security attacks that may give unauthorized transponders access to the transceiver. First an unauthorized listener may be placed within the forward channel range of an authorized RFID transceiver to capture the transmission of the secret 'key'. Second, an unauthorized transceiver may retrieve the transponder metaID through an open query of the transponder. The metaID is the value of the secret key hashed: metaID=hash (key) while the ID is the original RFID. Making sure the RFID, metaID couple match allows the infrastructure to detect RFID spoofing. The metaID may then be transmitted to an authorized transceiver, which will then return the secret 'key' for capture unknowingly creating a breach in security. In each of these cases the captured secret 'key' may then be used by an unauthorized transceiver to unlock the transponder. Also since the metaID remains constant for any one transponder the transponder may also be tracked by this value which may present a privacy issue.

Randomized access control is a security mechanism directed at preventing attacks that would be launched against systems utilizing the Hash-Based access control model. In randomized access control a pseudo-random number function is included on the transponder to generate random values. The random values are combined with the transponder's ID and hashed by the transponder to create a random metaID. The random value and the metaID are both sent by the transponder when it is queried by a transceiver. If the transceiver is authorized it will relay the values to the RFID infrastructure where an exhaustive search will be used to extract the original ID from a known list of valid IDs. Although this method prevents the replay attack that may occur with the Hash-based model and it solves the privacy issue with a constant metaID it is still susceptible to the listener attack. Although hashing is a one way function, it is not cryptographic. Bits of the ID may be determined by listening to multiple exchanges. This solution is also limited in scalability due to the exhaustive search method used to derive the secret 'key'. If the number of transponders managed by an RFID infrastructure is large then the performance of the system will suffer significantly.

Silent Tree Walking or Backward Channel Key Negotiation are security mechanisms that may be employed to limit the effectiveness of unauthorized listener attacks. Each of these methods implements a protocol that prevents an unauthorized listener from gaining information about a transponder from listening only to the forward channel transmissions. This prevents remote listeners that may easily pick up the stronger transceiver signals but does not prevent an attack by listeners within the range of the transponders backward channel transmissions.

The use of Blocker tags is a security mechanism that helps to prevent privacy violations. The blocker tag is a special RFID transponder that prevents RFID transceivers from gathering data from other transponders in their immediate vicinity. Without it, any RFID transceiver could query any transponder. In a consumer retail environment this would prevent retailers or other companies from reading the transponders on any merchandise a customer may be carrying and thus protecting the consumers' privacy. It is unclear how blocker tags could be appropriately controlled to prevent their misuse such as the use of blocker tags to block transponders that should be available for security purposes.

A final security mechanism concentrates on protecting the data associated with a transponder. In this mechanism it is assumed that the transponder provides an RFID that may be used to look up information about the physical object that the transponder is attached to. This information is maintained in the RFID infrastructure and not on the transponder itself. In this mechanism a method of transceiver authorization combined with infrastructure access control is used to prevent distribution of the data to unauthorized transceivers. This mechanism only secures information that is centralized to the RFID infrastructure and does not provide protection for any data that may be stored on the RFID transponder. This mechanism also doesn't prevent tracking of an object based on its RFID ID.

SUMMARY OF THE INVENTION

According to one broad aspect, the invention provides a method in a transceiver comprising: reading encrypted information from a transponder; transmitting a request to access the encrypted information; wherein the request comprises authentication credentials for authenticating the transceiver.

In some embodiments the request further comprises authorization data for authorizing the transceiver.

In some embodiments the method further comprises: receiving as a response to the request, decryption information for use in decrypting the encrypted information to recover the information.

In some embodiments the decryption information is encrypted so as to be decryptable by the transceiver.

In some embodiments the method further comprises: decrypting the encrypted decryption information; and decrypting the encrypted information with use of the decryption information, to recover the information.

In some embodiments the decryption information is a decryption key.

In some embodiments the decryption information is encrypted with a public key corresponding to a private key of the transceiver.

In some embodiments the decryption key is a symmetric key, and the encrypted information comprises the information encrypted with the symmetric key.

In some embodiments the method further comprises before the request is transmitted: reading an identifier of the transponder from the transponder; and transmitting the identifier as a query to access data associated with the transponder.

In some embodiments the method further comprises: receiving as a response to the query, the data.

In some embodiments the request further comprises the data.

In some embodiments the data associated with the transponder is for use in decrypting the encrypted information.

In some embodiments the data comprises encrypted decryption information, the decryption information for use in decrypting the encrypted information.

In some embodiments the data is encrypted using public key corresponding to a private key of an authenticating authority, and wherein the request is transmitted to the authenticating authority.

In some embodiments the query is sent to a datastore.

In some embodiments the authenticating authority is a key release agent (KRA).

In some embodiments the datastore is an RFID infrastructure database.

In some embodiments the datastore and the authenticating authority are part of an RFID infrastructure.

In some embodiments the method further comprises: encrypting new information to generate encrypted new information; and storing the encrypted new information on the transponder.

In some embodiments the method further comprises: storing new data in the datastore.

In some embodiments the new information is encrypted with a new key.

In some embodiments the new key is generated by the transceiver.

In some embodiments the new key is a new symmetric key.

In some embodiments the new data comprises encrypted new decryption information for use in decryption of the encrypted new information.

In some embodiments the method further comprises: encrypting the new decryption information with a public key of the authenticating authority.

In some embodiments the encrypted new information is stored in the datastore in association with the RFID of the transponder.

In some embodiments the method further comprises: before transmitting the request: reading an identifier of the transponder from the transponder; transmitting the identifier of the transponder as a query to access data associated with the transponder; and receiving as a response to the query, the data, wherein the data is encrypted decryption information, the decryption information for use in decrypting the encrypted information to recover the information; wherein the request further comprises the data; and after transmitting the request: receiving as a response to the request, the decryption information re-encrypted, wherein the decryption information is decryptable by the transceiver.

In some embodiments the decryption information is a symmetric key encrypted with a public key corresponding to a private key of the transceiver, the method further comprising after receiving the re-encrypted decryption information: decrypting the re-encrypted decryption information to recover the symmetric key; and decrypting the encrypted information with use of the symmetric key, to recover the information.

In some embodiments the query is transmitted to an RFID infrastructure database of an RFID infrastructure, and wherein the data received in response to the query is encrypted with a public key corresponding to a private key of a key release agent (KRA) of the RFID infrastructure, and wherein the request is transmitted to the KRA.

In some embodiments the decryption key is a private key corresponding to a public key of the transponder, and the encrypted information comprises the information encrypted with the symmetric key.

In some embodiments the request further comprises the encrypted information.

In some embodiments, the method further comprises: receiving as a response to the request, the information re-encrypted in a manner decryptable by the transceiver.

In some embodiments the encrypted information is encrypted with a public key of an authenticating authority of an infrastructure, and wherein the request is transmitted to the authenticating authority.

In some embodiments the re-encrypted information is encrypted with a public key corresponding to a private key of the transceiver, the method further comprising after receiving the re-encrypted information: decrypting the re-encrypted information to recover the information.

In some embodiments the information comprises data pertaining to the transponder.

In some embodiments the information is an identifier of the transponder.

In some embodiments, the method further comprises: transmitting the identifier as a query to access data associated with the transponder; receiving as a response to the query, the data, wherein the data pertains to the transponder.

In some embodiments the method further comprises before the request is transmitted: reading an identifier of the transponder from the transponder; transmitting the identifier in the request to access the encrypted information.

In some embodiments the method further comprises: receiving as a response to the request, decryption information for use in decrypting the encrypted information to recover the information.

In some embodiments the decryption information is information for generation of a decryption key, wherein the step of decrypting the encrypted information with use of the decryption information comprises: generating the decryption key using the decryption information; decrypting the encrypted information using the decryption key to recover the information.

In some embodiments the method further comprises before the request is transmitted: reading an encrypted identifier of the transponder from the transponder; and transmitting the encrypted identifier as a query to access data associated with the transponder.

In some embodiments the method further comprises: receiving as a response to the query, the data; wherein the request further comprises the data.

In some embodiments the data associated with the transponder comprises encrypted decryption information, the decryption information for use in decrypting the encrypted information and for use in decrypting the encrypted identifier.

In some embodiments the data is encrypted with a public key corresponding to a private key of an authenticating authority of an infrastructure, and wherein the request is transmitted to the authenticating authority.

In some embodiments the query is sent to a datastore of the infrastructure.

In some embodiments the transceiver is of a specific domain of a multi-domain system, the method further comprising: receiving as a response to the request, decryption information for use in decrypting a portion of the encrypted information corresponding to the domain of the transceiver, to recover a portion of the information corresponding to the domain.

In some embodiments the authentication credentials for authenticating the transceiver are further for authorizing a data security level of data the transceiver is allowed access, the method further comprising: receiving in response to the request, decryption information for use in decrypting a portion of the encrypted information having the data security level the transceiver is authorized to access.

In some embodiments the transceiver is of a specific domain of a multi-domain system, and wherein the authentication credentials for authenticating the transceiver are further for authorizing the transceiver to access data of domain other than the specific domain, the method further comprising: receiving as a response to the request, decryption information for use in decrypting a portion of the encrypted information corresponding to the domain of the transceiver, to recover a portion of the information corresponding to the domain, and policy rule information specifying which if any domain the transceiver is authorized access to other than the specific domain.

In some embodiments the request is transmitted to an authenticating authority of the specific domain, the method further comprising: transmitting a request to access a portion of the encrypted information corresponding to a domain other than the specific domain, wherein the request comprises the authentication credentials of the transponder.

In some embodiments, the method further comprises: to access a particular capability/function, the transceiver employing a passcode needed to unlock this capability/function; wherein to obtain the passcode to unlock a capability/function, the transceiver requests the passcode from an RFID infrastructure, and the transceiver receives the passcode from the RFID infrastructure if a set of one or more defined rules are satisfied.

According to another broad aspect, the invention provides a method in an authenticating authority comprising: receiving a request from a transceiver for access to encrypted information of a transponder, the request comprising authentication credentials; authenticating the transceiver with use of the authentication credentials.

In some embodiments the method further comprises if the transceiver is authenticated: transmitting to the transceiver as a response to the request, decryption information for use by the transceiver in decrypting the encrypted information to recover the information.

In some embodiments the request comprises the decryption information encrypted, the method further comprising: decrypting the encrypted decryption information; and re-encrypting the decryption information for transmission to the transceiver.

In some embodiments the decryption information is re-encrypted with a public key corresponding to a private key of the transceiver.

In some embodiments the request further comprises the encrypted information, the method further comprising: re-encrypting the information in a manner decryptable by the transceiver; transmitting to the transceiver in further response to the request, the re-encrypted information.

In some embodiments the encrypted information is encrypted with a public key corresponding to a private key of the authenticating authority.

In some embodiments the request further comprises an identifier of the transponder, the method further comprising: transmitting to the transceiver as a response to the request, decryption information for use by the transceiver in decrypting the encrypted information to recover the information.

In some embodiments the authentication credentials for authenticating the transceiver are further for authorizing a data security level of data the transceiver is allowed access, the method further comprising: transmitting to the transceiver as a response to the request, decryption information for use by the transceiver in decrypting a portion of the encrypted information having the data security level the transceiver is authorized to access.

In some embodiments the authenticating authority is of a specific domain of a multi-domain system, and wherein the authentication credentials for authenticating the transceiver are further for authorizing the transceiver to access data of the specific domain, the method further comprising: transmitting to the transceiver as a response to the request, decryption information for use in decrypting a portion of the encrypted information corresponding to the specific domain, to recover a portion of the information corresponding to the specific domain.

In some embodiments the method further comprises: if the transceiver is of the same domain as the authenticating authority: transmitting to the transceiver further in response to the request, policy rule information specifying which if any domain the transceiver is authorized access to other than the specific domain.

In some embodiments the method further comprises before the step of transmitting to the transceiver: if the transceiver is of a second domain other than that of the authenticating authority: transmitting an authentication request to a second authenticating authority of the second domain, wherein the authenticating request comprises the authentication credentials of the transceiver; receiving in response to the authentication request confirmation of the transceiver's authentication.

Other embodiments provide a computer readable medium or combination of computer readable media having instructions stored thereon for implementing one of the above summarized methods.

Yet further embodiments provide transponders adapted to implement the transponder executed steps of any one of the above summarized methods.

Further embodiments provide RFID infrastructure adapted to implement the RFID infrastructure executed steps of any one of the above summarized methods.

Other embodiments provide a system comprising RFID transponders, RFID infrastructure, and key release agent collectively adapted to implement any one of the above summarized methods.

Yet further embodiments provide an authenticating authority adapted to implement the key release agent executed steps of any one of the above summarized methods. Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which:

FIG. 9 is a table summarizing an example implementation of policy service rules for access to transponder data by the transceivers;

DETAILED DESCRIPTION OF THE PREFERRED EMBODIMENTS

The following descriptions of the example embodiments describe methods, systems and devices for providing RFID system security. In particular the embodiments illustrate how cryptographically encrypting data stored on a transponder and managing the release of the decryption information, decryption keys, or the data itself to a transceiver having a transaction with the transponder can contribute to RFID security.

Figure 1:
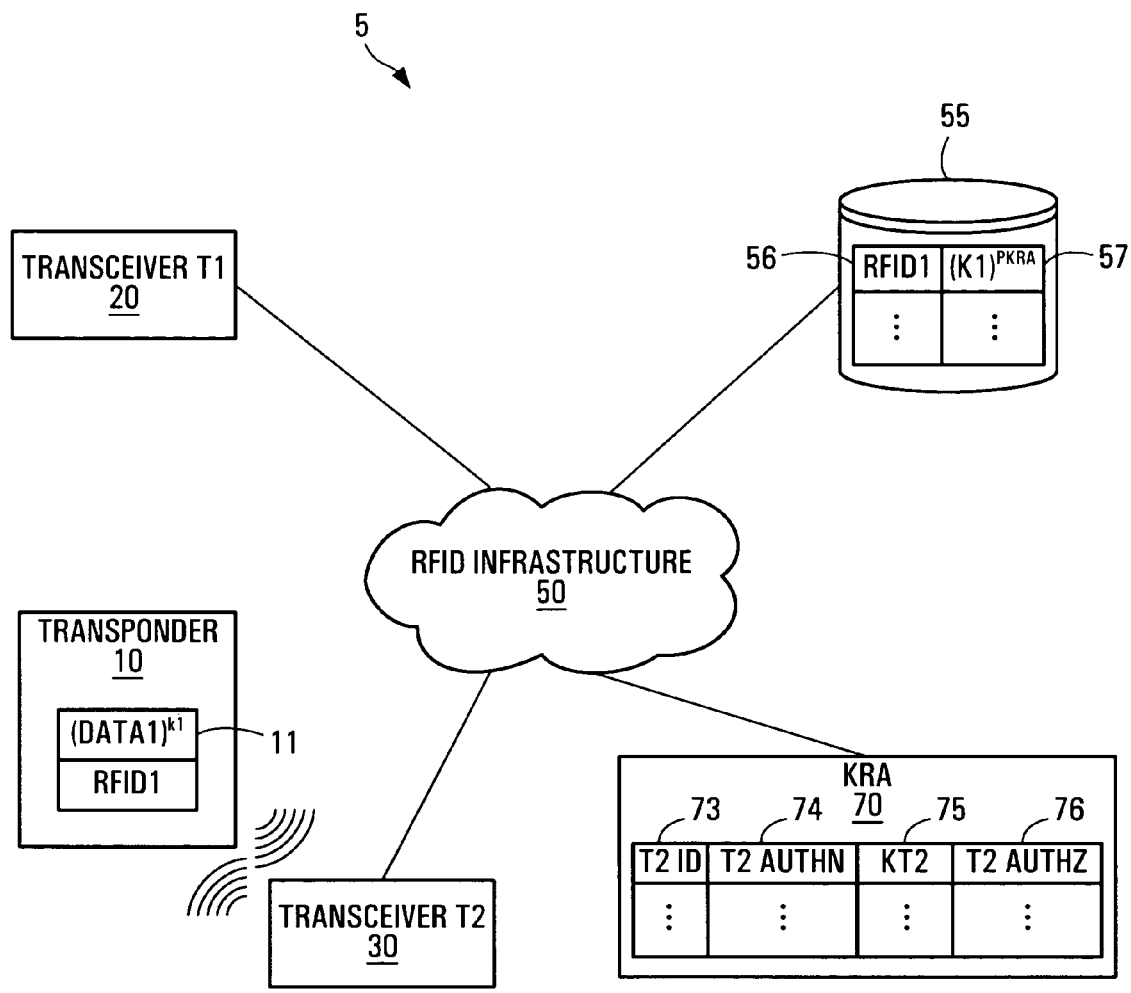
FIG. 1 is a block diagram of an RFID system according to one embodiment of the invention.

Referring to FIG. 1, an RFID system according to one embodiment of the invention will now be described.

In an RFID system generally indicated by reference numeral 5, transceivers T1 20 and T2 30 are networked to an RFID infrastructure 50. Coupled to the RFID infrastructure 50 and in some embodiments part of the RFID infrastructure 50, is an RFID infrastructure database 55. Also networked to the RFID infrastructure 50 or possibly a part of the RFID infrastructure 50 is a key release agent (KRA) 70. The KRA 70 has access to authorization and security data 75 pertaining to the transceivers of the RFID system 5. A transponder 10 of the RFID system 5 is depicted as being in communication with transceiver T2 30, and as having transponder information (DATA1) encrypted with key k1 and an identification or RFID (RFID1) stored in a datastore 11 of the transponder 10.

The system of FIG. 1 shows a single transponder 10. More generally, the system would be adapted to provide RFID security to any appropriate number of transponders. Furthermore, the system shows two transceivers T1 20 and T2 30. More generally, at least one transceiver would be required, and any larger number of transceivers may also be provided. The RFID infrastructure database 55 contains a record for each transponder. Only the record for the transponder 10 is shown. The record enclosed in the RFID 56 of the transponder and the encrypted decryption information 57 for the transponder is described in detail below. The key release agent 70 is responsible for authorizing requests for keys and releasing them if appropriate. In the illustrated example, there is a record for each transceiver that is authorized to access keys. The record shown is for transceiver T2 30. The record has three columns. The first column 73 contains the transceiver ID; the second column 74 contains authentication information; and the third column 75 contains security information. The use of these fields is detailed below. An example of a key release agent that might be employed is disclosed in commonly assigned U.S. Pat. No. 5,481,613. More generally KRA's may be employed in any system utilizing encryption. That disclosure is simply one example and any KRA capable of providing to a transreceiver of the RFID system appropriate access to encryption keys or information to generate the encryption keys, when the transreceiver is authorized may be provided by the invention. In some embodiments, records may also be maintained to determine which transceivers are authorized to access keys. In this case, an additional authorization step can be performed to determine if a particular transceiver is authorized to access keys for a particular transponder based on authorization information. Additional column 76 is shown containing authorization information, described in further detail below.

The functionality of the RFID system 5 of FIG. 1, will now be described.

At some time prior to the time depicted in FIG. 1, a transponder 10 has had a transaction with transceiver T1 20 of the RFID system 5, which caused a change in the transponder information. The transponder information as modified by transceiver T1 20 was stored in the transponder 10 as information DATA1. The data DATA1 was encrypted with k1 by T1 20 before being stored in the datastore 11 of the transponder 10. In some embodiments k1 is a symmetric key, in other embodiments a public key, and in other embodiments a generated key. For the purposes of FIG. 1, k1 represents a specific type of encryption of the data DATA1. Once the transponder 10 was updated by transceiver T1 20, T1 20 forwarded an identification (RFID1) of the transponder along with associated encrypted decryption information $(K1)^{PKRA}$ to the RFID infrastructure 50. Both the RFID (RFID1) and the encrypted decryption information $(K1)^{PKRA}$ are stored in the database 55 of the RFID infrastructure 50. The decryption information K1 is for use in decrypting the encrypted transponder information $(DATA1)^{k1}$ and has been encrypted using the public key PKRA of the KRA 70. In an embodiment in which k1 is a symmetric key, K1 is also a symmetric key and is equal to k1. In an embodiment in which k1 is a public key, K1 is the private key corresponding to the public key k1. In an embodiment in which k1 is a generated key, K1 is comprised of the parameters or values which enable a transceiver to generate a key to decrypt $(DATA1)^{k1}$. In an embodiment in which k1 is a generated symmetric key, as for example in the Diffie-Hellmann cryptographic system, K1 is comprised of the parameters or values which enable remote generation of k1. Transceivers may already be equipped with a number of constants to allow generation of the key.

For example, in the Diffie-Hellman system, the resulting symmetric key is $a^{xy} \mod(p)$ where p is a prime number such that p−1 has a large prime factor, and where a is a primitive element in GF(p). The numbers x and y are each $\geq 0$ and $\leq p-1$. In the embodiment using this system, the key k1 would be $a^{xy} \mod(p)$ while the parameter K1 could be xy or could include x and y, T2 would have values a and p and could then generate k1. In fact K1 can be any number of values a, p, x, and y as long as T2 has possession of the remaining values and is adapted to generate $a^{xy} \mod(p)$.

At the point in time depicted in FIG. 1, the transponder 10 is in communication with transceiver T2 30 and attempts to recover the data stored on the transponder. The transponder 10 forwards the encrypted transponder information $(DATA1)^{k1}$ and the identification RFID1 of the transponder 10 to T2 30 in response to T2's polling of transponders within its forward range. Since the transponder information DATA1 is encrypted, transceiver T2 30 requires decryption information for decrypting the encrypted transponder information. To obtain this information transceiver T2 30 forwards the RFID of the transponder, namely RFID1 as a query to the RFID infrastructure 50, which in turn uses the RFID1 to retrieve from the database 55 the encrypted decryption information $(K1)^{PKRA}$ associated with RFID1. The RFID infrastructure 55 then forwards the encrypted decryption information $(K1)^{PKRA}$ to T2 30.

In order to recover the decryption information K1, transceiver T2 30 forwards the encrypted decryption information $(K1)^{PKRA}$, transceiver T2's identification T2ID, and its credentials T2CRED to the KRA 70. The credentials of a transreceiver include information sufficient to authenticate the transreceiver. Public key based authentication credentials are preferred but others may be supported. The KRA 70 analyzes the T2ID and T2CRED, and authenticates transceiver T2 30 using the authentication information T2 AUTHN of the authentication and security information 75. As indicated above, in some embodiments, authorization is performed in addition to authentication. Authentication is used to verify a transceiver's authenticity, and authorization decides whether a transceiver thus authenticated is to be allowed to decrypt. In some embodiments these two steps can be merged into one, or authorization is simply not implemented. In the illustrated example, column 76 stores authorization information T2 AUTHZ. This may also be encrypted for the KRA to prevent tampering. Once T2 is authenticated, then authorization is performed in such embodiments. If authorization is used, then the query from T2 to the KRA may need to carry authorization data, for example in an authorization data packet (AUTHZ_DATA) which may contain the RFID1. If T2 30 is authenticated (and authorized if necessary), the KRA 70 decrypts the encrypted decryption information $(K1)^{PKRA}$ using its private key to recover the decryption information K1. The KRA 70 then encrypts the decryption information K1 using a public key of transceiver T2 30, namely, PT2 to generate transceiver encrypted decryption information $(K1)^{PT2}$ for decryption only by transceiver T2 30. The KRA 70 uses security information KT2 75 either to generate PT2 (the public key of T2) or KT2 75 is itself PT2. The KRA 70 forwards the transceiver encrypted decryption information $(K1)^{PT2}$ to transceiver T2 30. Using its private key, transceiver T2 30 decrypts the transceiver encrypted decryption information $(K1)^{PT2}$ to recover the decryption information K1, and then decrypts the encrypted transponder information $(DATA1)^{k1}$ using the decryption information K1.

Figure 2A:
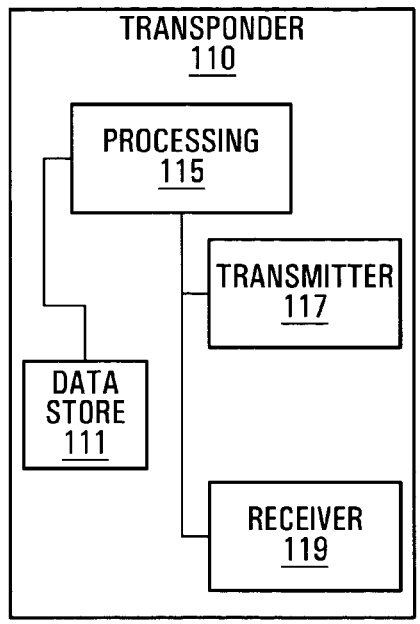
FIGS. 2A, 2B, and 2C are functional block diagrams respectively of a transponder, transceiver, and KRA according to another embodiment of the invention.

Referring now to FIG. 2A, a transponder that can be used with various embodiments of the invention will now be described.

Transponder 110 includes a processing unit 115 which in its simplest implementation is capable of basic communications and data storage retrieval functions.

Coupled to the processing unit 115 is a transmitter 117 and a receiver 119 for use in radio frequency communication with transceivers of the RFID system.

Also coupled to the processing unit 115 is the transponder data store 111 which typically is used to store encrypted transponder information and an RFID or identification of the transponder. In some embodiments the data store 111 is used to store a metaID in the form of an encrypted RFID in place of the RFID.

It should be understood that transponder 110 may also include other standard elements such as a capacitor and other circuitry for powering up if the transponder 110 is passive, or such as a power source if the transponder 110 is not passive.

Figure 2B:
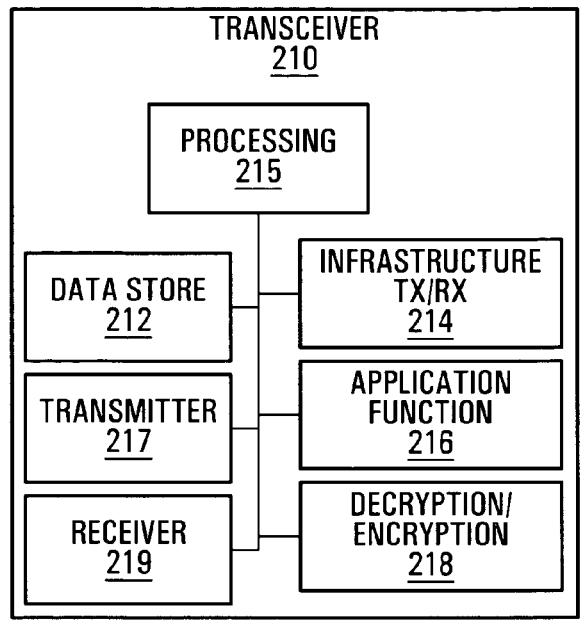

Referring to FIG. 2B, a transceiver according to an embodiment of the invention will now be described. Transceiver 210 includes a processing unit 215. Processing unit 215 is coupled to a data store 212, a radio transmitter 217, and a radio receiver 219. The data store 212 is for storing various data either calculated on the transceiver 210, originating from a transponder 110 with which it is communicating or from some other part of the RFID infrastructure.

The transceiver 210 includes an infrastructure transmitter/receiver (Tx/Rx) 214 for communicating with the RFID system infrastructure.

In some embodiments, transceiver 210 also includes an application function 216 which includes a set of instructions which may be performed by the processing unit 215. The application function typically includes custom programs for carrying out a particular transaction between the transceiver 210 and a transponder 110.

Also included in transceiver 210 is a decryption/encryption function 218 which enables the transceiver to perform cryptographic operations in support of the security implementation according to the invention. In some embodiments this entails symmetric key cryptographic capability, in other embodiments this entails public/private key cryptographic capability, and in other embodiments this entails key generation in addition to encryption and decryption. A transceiver may consist of a single unit with all these functions or it may be spread across several specialized components working together.

Figure 2C:
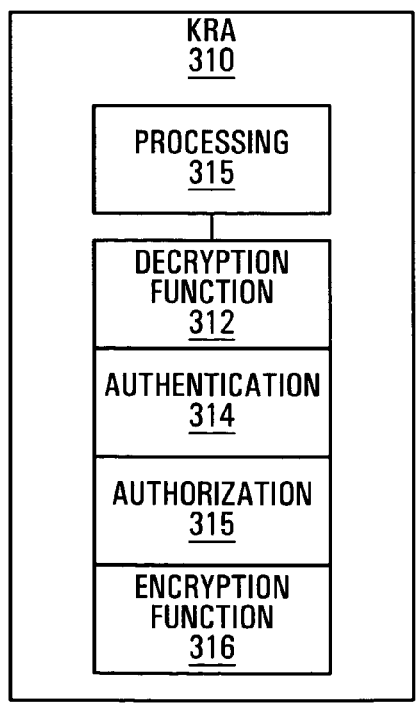

Referring to FIG. 2C a key release agent according to an embodiment of the invention will now be described.

A key release agent KRA 310 includes a processing unit 315, a decryption function 312, an encryption function 316, and an authentication processing 314. As will be described in association with embodiments described below, the KRA 310 uses the decryption function 312 to decrypt the encrypted decryption information, uses the authentication function 314 to authenticate transceivers, and uses the encryption function 316 to encrypt the decryption information to generate transceiver encrypted decryption information. In some embodiments, there is an authorization function 315 to implement the above described authorization procedure or a variant thereof. In some embodiments, an authorization function can be implemented separately from the remainder of the KRA.

In some embodiments, the KRA stores locally the authentication and security information. In other embodiments, a communication function (not shown in the figure) accesses transceiver information such as security and authentication information related to the transceivers. In either case, the KRA 310 is adapted to access the security and authentication information as required.

Figure 3:
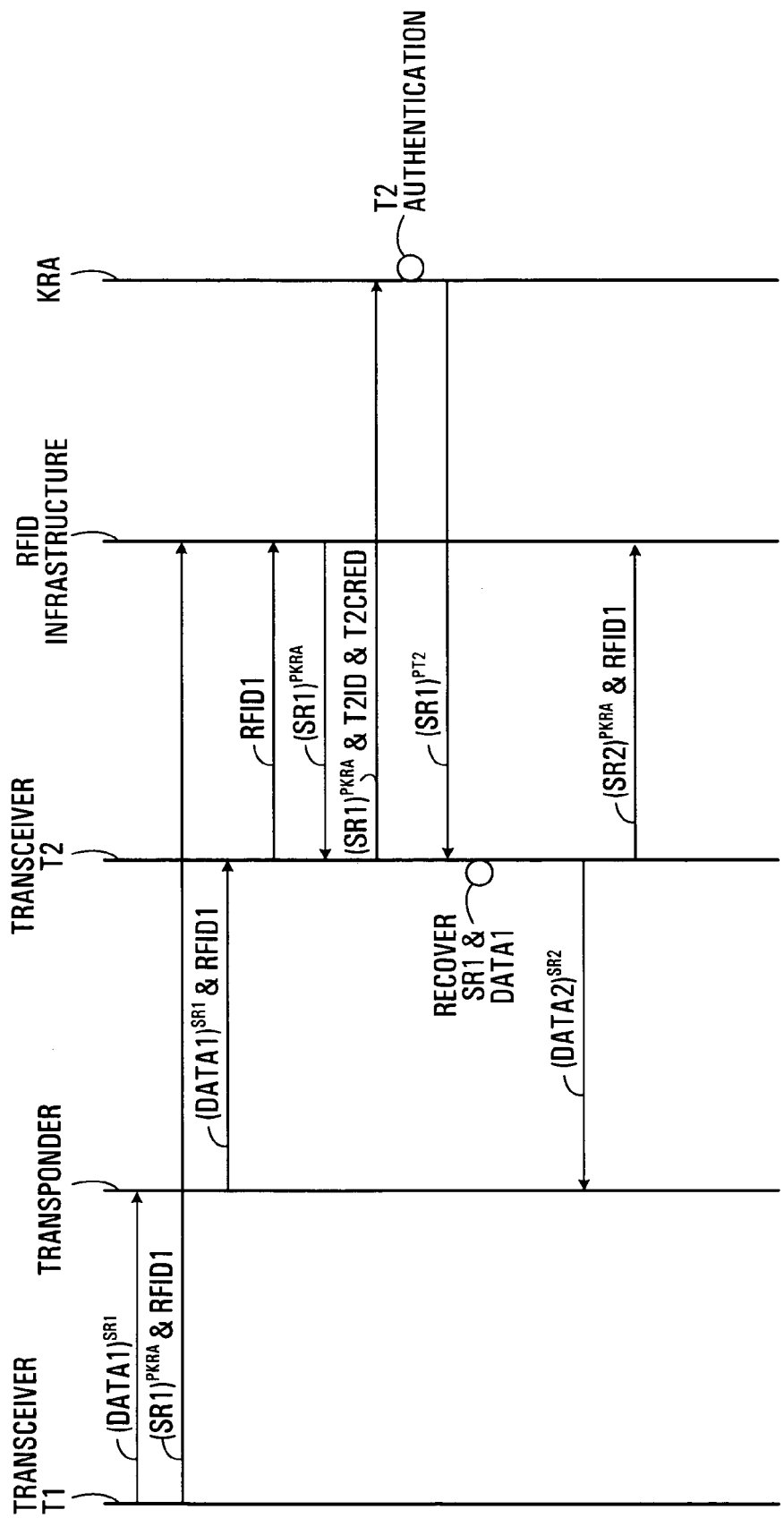
FIG. 3 is a signal flow diagram of a method of transponder information security according to an embodiment of the invention utilizing symmetric keys.

Referring now to FIG. 3, method of providing transponder information security according to an embodiment of the invention utilizing symmetric keys will now be discussed.

In the signal flow diagram of FIG. 3 as with the remaining signal flow diagrams, vertical lines indicate devices, destinations, or events while horizontal arrows represent signal flow between devices, destinations or events. Time flows from top to bottom. In FIG. 3, transceivers T1 and T2 along with a transponder, RFID infrastructure and a KRA are shown as vertical lines, while the data flows between them illustrate the depicted method embodiment.

During or at the end of a transaction with the transponder, a transceiver T1 sends transponder data, DATA1, which has been encrypted using symmetric key SR1, to the transponder. The transponder stores the encrypted transponder data $(DATA1)^{SR1}$. T1 encrypts the symmetric key SR1 with the public key PKRA of the KRA generating encrypted decryption information $(SR1)^{PKRA}$, and forwards the encrypted decryption information and the RFID of the transponder (RFID1) to the RFID infrastructure where it is stored.

At a later time the transponder has a transaction with transceiver T2. The transponder forwards the encrypted transponder information $(DATA1)^{SR1}$ and its RFID (RFID1) to transceiver T2. Transceiver T2 sends, the RFID to the RFID infrastructure as a query. The RFID infrastructure retrieves from its database the encrypted decryption information $(SR1)^{PKRA}$ associated with (RFID1) and returns it to transceiver T2. Transceiver T2 forwards the encrypted decryption information $(SR1)^{PKRA}$, its identification, namely T2ID, and its credentials T2CRED to the KRA. The KRA utilizes authentication information to authenticate transceiver T2. If T2 is authenticated the KRA decrypts the encrypted decryption information $(SR1)^{PKRA}$ using its private key to recover the decryption information SR1. The KRA then encrypts the decryption information with the public key PT2 of transceiver T2 to generate transceiver encrypted decryption information $(SR1)^{PT2}$ so that only transceiver T2 may decrypt it. After transceiver T2, using its private key, has decrypted the encrypted decryption information $(SR1)^{PT2}$ to recover SR1, the transceiver decrypts the encrypted transponder information $(DATA1)^{SR1}$ to recover the transponder information DATA1.

In some embodiments, authorization data is also sent to the KRA, and an authorization step is performed after the authentication step. In such cases, successful authorization needs to occur before the key is released.

Once the transponder and transceiver are finished communicating, if the transponder data has been modified, new transponder information DATA2 is encrypted with a new symmetric key SR2 generated for example by the transceiver T2 to generate second encrypted transponder information $(DATA2)^{SR2}$. The transceiver T2, encrypts the new symmetric key SR2 using the public key PKRA of the KRA to generate new encrypted decryption information $(SR2)^{PKRA}$. The new encrypted decryption information $(SR2)^{PKRA}$ is forwarded to the RFID infrastructure with the associated RFID, namely RFID1 where it is stored, for the next transaction between the transponder and a transceiver.

The embodiment depicted in FIG. 3 utilizes symmetric keys generated by the last transceiver which transacted with the transponder. The transceiver's forwarding of an encrypted version of the symmetric key to the RFID infrastructure ensures that another authorized transceiver will be able to access the data encrypted on the transponder once it has recovered the symmetric key stored in the RFID infrastructure. It is to be understood that the transponder may be initialized in a manner similar to the manner in which a transceiver stores data in a transceiver-transponder transaction. Symmetric keys are well suited for encryption of information stored on the transponder. The keys and the resulting encrypted data are smaller than encryption data resulting from the use of public/private keys. Also, the same key is used both for encryption and decryption. It should be understood however that any form of encryption may be used in some embodiments.

Encrypting data with an encryption key which is also encrypted and stored elsewhere provides an extra layer of protection. In some embodiments, the transponder information is encrypted with the public key of the key release agent. In that embodiment, the KRA and hence its private key is assumed to be secure.

Figure 4A:
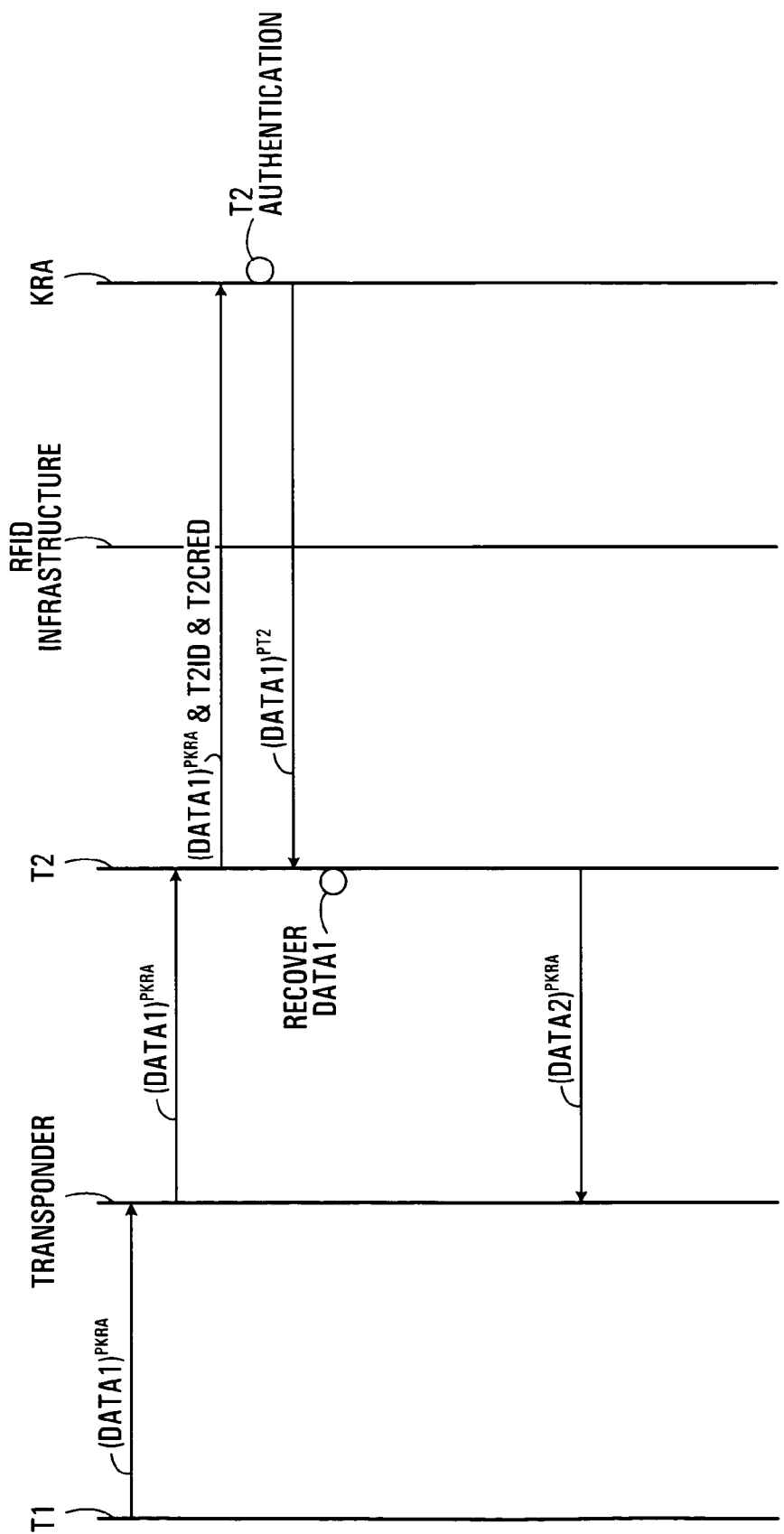
FIGS. 4A and 4B are signal flow diagrams of methods of transponder information security according to an embodiment of the invention utilizing public KRA key encryption.

FIG. 4A depicts an embodiment in which the transponder information DATA1 is encrypted using the public key PKRA of the KRA. As discussed above, although FIG. 4 shows T1 performing this operation, it could be done at initialization.

When the transponder has a transaction with transceiver T2, the transponder forwards the encrypted transponder information $(DATA1)^{PKRA}$ to T2. In the embodiment depicted in FIG. 4, there is no additional layer of encrypting the decryption information required to recover the transponder data, and hence no encrypted key for recovering DATA1 is stored in the RFID infrastructure. Consequently, T2 directly forwards the encrypted transponder information (DATA1)$^{PKRA}$ along with its identification T2ID and credentials T2CRED to the key release agent KRA. The KRA authenticates T2 and decrypts the encrypted transponder information (DATA1)$^{PKRA}$ with its private key. The KRA then encrypts the transponder information using the public key of transceiver T2, namely PT2, to generate transceiver encrypted transponder information for decryption only by the transceiver T2. The transceiver T2 decrypts the transceiver encrypted transponder information (DATA1)$^{PT2}$ to recover the transponder information DATA1. Transceiver T2 then is free to transact with the transponder using the transponder information DATA1. If the transponder data is updated to DATA2, transceiver T2 encrypts DATA2 with PKRA to generate new encrypted transponder data which is then forwarded to the transponder for storage. As before, in some embodiments there may be an authorization step.

Figure 4B:
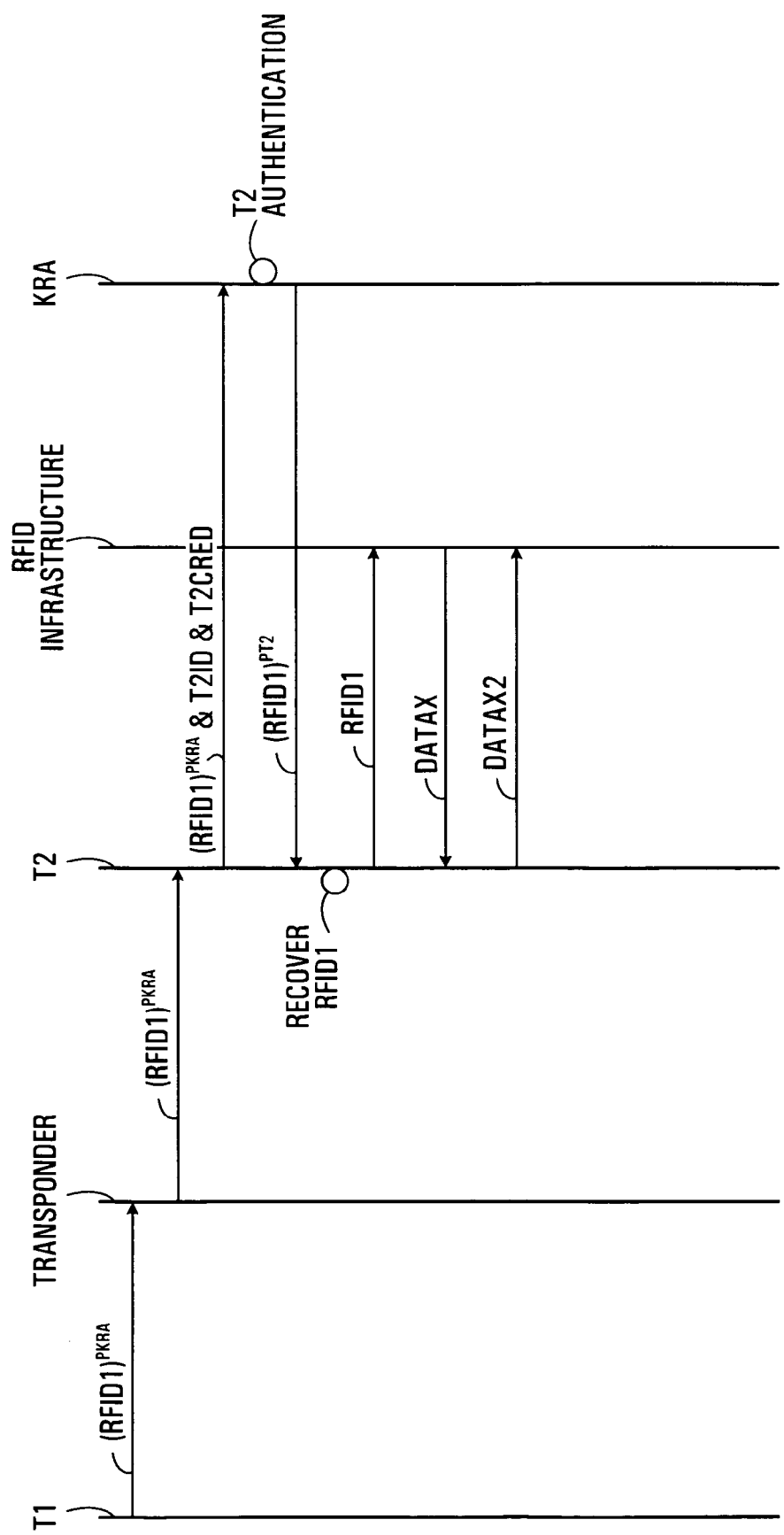

In another embodiment depicted in FIG. 4B, in which an additional layer of security is utilized, the encrypted information stored on the transponder is an identification of the transponder, for example RFID1. Any sensitive data is stored within the RFID infrastructure. For example, DATAX might be stored in the RFID infrastructure and associated with the RFID of the transponder. The transreceiver sends (RFID1)$^{PKRA}$ and its identification and authentication information to the KRA which authenticates T2 and returns (RFID1)$^{PT2}$ which T2 decrypts. T2 then forwards RFID1 to the RFID infrastructure. The RFID infrastructure once it has been passed RFID1 from the authenticated transceiver T2, then returns the DATAX. Any update to the transponder data (DATAX) is sent to the RFID infrastructure for storage. Since the data stored on the transponder is its RFID, no update of the transponder is required unless there is change in its RFID. If the transponder data is updated, the transceiver T2 can then forward the new data DATAX2 to the RFID infrastructure for storage.

Although the embodiments described above depict the transceivers themselves exchanging information with the RFID infrastructure and the KRA, and depict there being no communication between the KRA and the RFID infrastructure, in some embodiments the RFID infrastructure and KRA are integrated or networked together for communication.

Figure 5:
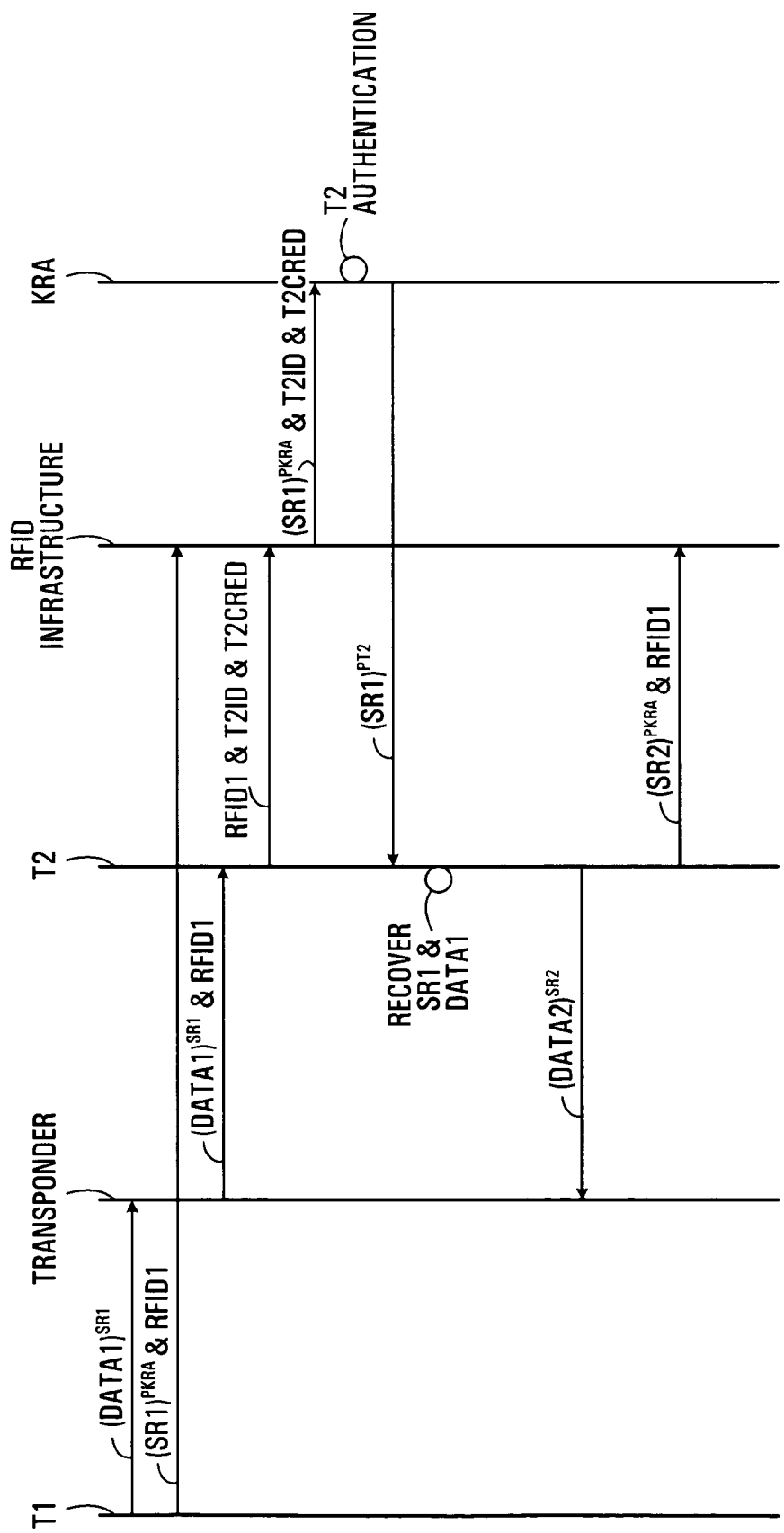
FIG. 5 is a signal flow diagram of a method of transponder information security according to an embodiment of the invention in an RFID system utilizing integration.

FIG. 5 shows a signal flow diagram in which the RFID infrastructure and the KRA are integrated in the sense that they communicate with each other directly.

In a similar manner to the signal flow depicted in FIG. 3, the transponder is loaded with an encrypted version of the transponder data (DATA1)$^{SR1}$ which in this case is encrypted with a symmetric key SR1.

The RFID infrastructure is loaded with a copy of SR1 encrypted with a KRA public key PKRA to generate encrypted decryption information (SR1)$^{PKRA}$. The RFID infrastructure is also loaded with the RFID of the transponder, namely RFID1.

When the transponder begins a transaction with T2, the RFID and the encrypted transponder data are transmitted from the transponder to T2.

In order to obtain the decryption information T2 forwards the identification of the transponder RFID1, along with T2's identification T2ID and T2's credentials T2CRED to the RFID infrastructure.

Upon receipt of this information the RFID infrastructure uses RFID1 to find the associated encrypted decryption information (SR1)$^{PKRA}$. The RFID infrastructure then forwards (SR1)$^{PKRA}$ along with T2ID and T2CRED directly to the KRA.

The KRA performs authentication of T2 which in a sense has been referred to the KRA by the RFID infrastructure. If T2 is authenticated, the KRA decrypts the encrypted decryption information (SR1)$^{PKRA}$ to recover SR1 and encrypts SR1 using T2's public key PT2. The resulting transceiver encrypted decryption information (SR1)$^{PT2}$ is forwarded to transceiver T2 where SR1 is recovered and used to recover the transponder information DATA1. In some embodiments, (SR1)$^{PT2}$ may be sent back to the RFID infrastructure and then relayed to T2.

In a similar manner to that described in associated with the embodiments discussed above, T2 may update the data on the transponder by encrypting new data with a new key, storing the new encrypted transponder data (DATA2)$^{SR2}$ on the transponder and forwarding an encrypted version of the decryption information (SR2)$^{PKRA}$ along with the associated RFID to the RFID infrastructure.

By integrating the RFID infrastructure and the KRA, transceiver T2 does not need to act as an intermediary between different elements of the RFID infrastructure which are utilized to return the decryption information back to transceiver T2. Transceiver T2 simply forwards all of the necessary information in performing a request for the decryption information, and is subsequently provided with the decryption information.

In some integrated embodiments, the RFID infrastructure and the KRA are combined in an element of the RFID infrastructure. This combined element would simply perform all of the actions as depicted in FIG. 5 attributed to the RFID infrastructure and the KRA.

Each of the embodiments discussed above, the transponder information was encrypted using a symmetric key or using the public key of the KRA.

Figure 6:
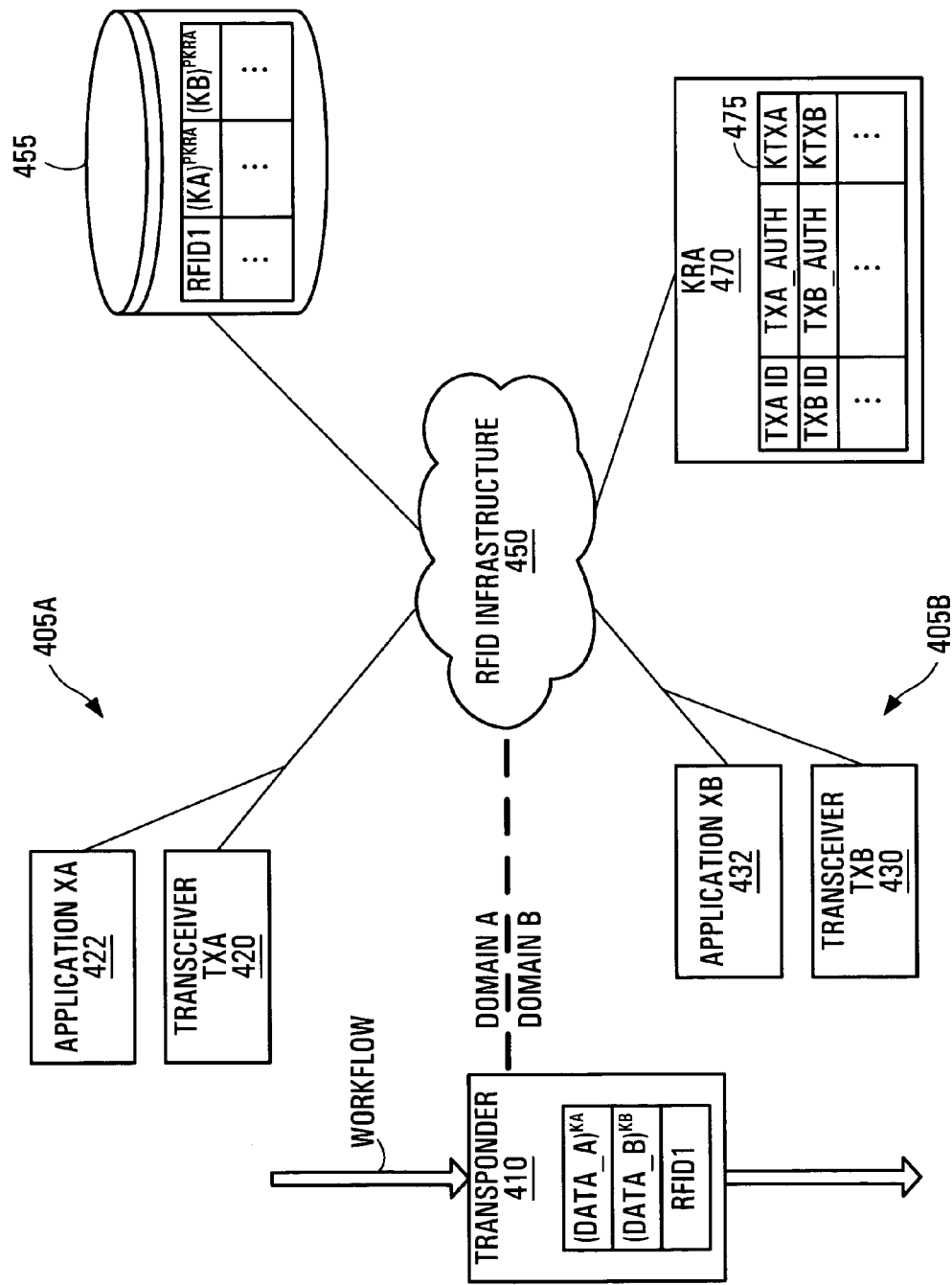
FIG. 6 is a block diagram of a multi-domain RFID system according to an embodiment of the invention.

Referring to FIG. 6, RFID transponder information security in a multi-domain RFID system will now be discussed.

Many industries and businesses may be structured in such a manner that an RFID system adapted to operate within that industry or business would be much more useful and efficient if it had logical subdivisions which paralleled those of the industry or business. As such, there may be different kinds of transponders which follow different paths through the RFID system and which may undergo different kinds of transactions. A system in which a particular type of transponder will perform one kind of transaction involving one application, and subsequently another kind of transaction involving a second application, would benefit from a multi-domain structure in which each domain is dedicated to a particular stage and application which will transact with the transponder. As such, a multi-domain RFID system can provide separate security at different stages of the transponder's transaction cycle. Allowing for separate security by stage provides a system which can support an industry which may have distinct parties or legal entities responsible for different stages within the industry or business cycle reflected by a parallel stage of the transponder transaction cycle. It should be understood that various business structures may benefit from a multi-domain RFID system implementation of security according to the invention although only a small number are presented herein.

In FIG. 6, two domains of the RFID infrastructure 450 are depicted, DOMAIN A, generally indicated by numeral 405A and DOMAIN B, generally indicated by numeral 405B. The transponder 410 is depicted as having a work flow within its transaction cycle which first involves DOMAIN A 405A, and subsequently DOMAIN B 450B. DOMAIN A 405A includes transceiver TXA 420 which performs transactions with transponders according to an application application XA 422. DOMAIN A 405A can include more than one transceiver, and transceiver TXA 420 may have more than one associated application, although only one transceiver and one application are depicted in DOMAIN A 405A of FIG. 6. Similarly, DOMAIN B 405B includes transceiver TXB 430 associated with application XB 432.

Figure 8:
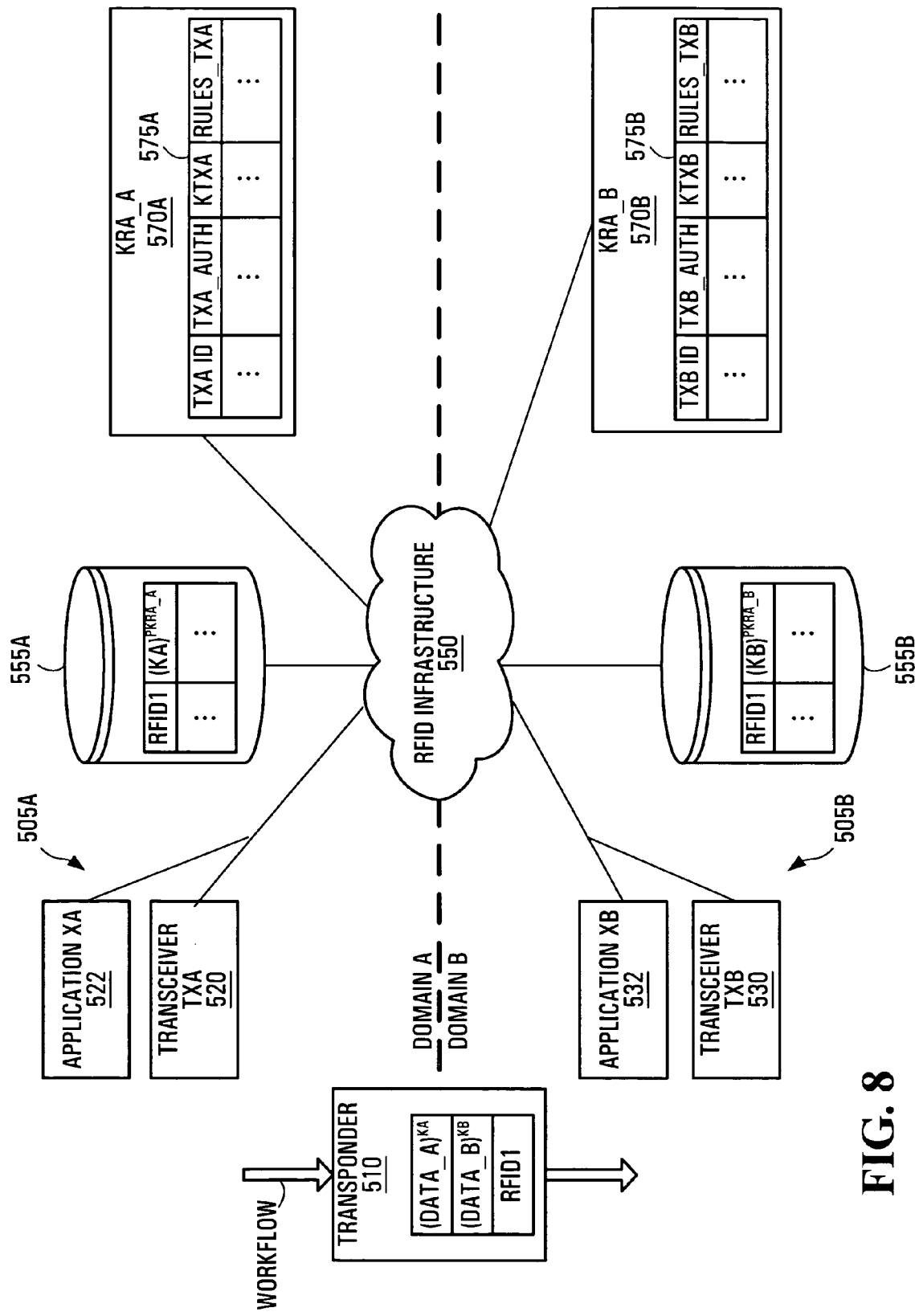
FIG. 8 is a block diagram of a multi-domain RFID system according to an embodiment of the invention utilizing multiple KRA's and policy service rules.

In the particular embodiment depicted in FIG. 8, the RFID infrastructure 450 has one database 455 for storing encrypted decryption information for both domains, and associated RFIDs. Likewise only one KRA 470 is implemented to authenticate transceivers of both domains and forward transceiver encrypted decryption information back to the transceivers.

In FIG. 6, the transponder 410 has data relevant to DOMAIN A 405A, namely DATA_A which has been encrypted with use of key KA. The transponder 410 also has data relevant to DOMAIN B 405B, namely DATA_B which has been encrypted with use of key KB. The transponder also possesses its own RFID, namely RFID1.

Stored in a data store 455 of the RFID infrastructure 450 is the RFID of the transponder 410, namely RFID1, and the associated KRA public key encrypted decryption information, namely DOMAIN A encrypted decryption information $(KA)^{PKRA}$, and DOMAIN B encrypted decryption information $(KB)^{PKRA}$. In the KRA 470, security and authentication information 475 include transceiver IDs such as TXAID, transceiver authentication information such as TXA_AUTH and transceiver decryption information such as KTXA. The information for transceivers in both DOMAIN A and DOMAIN B is stored in the same KRA.

Figure 7:
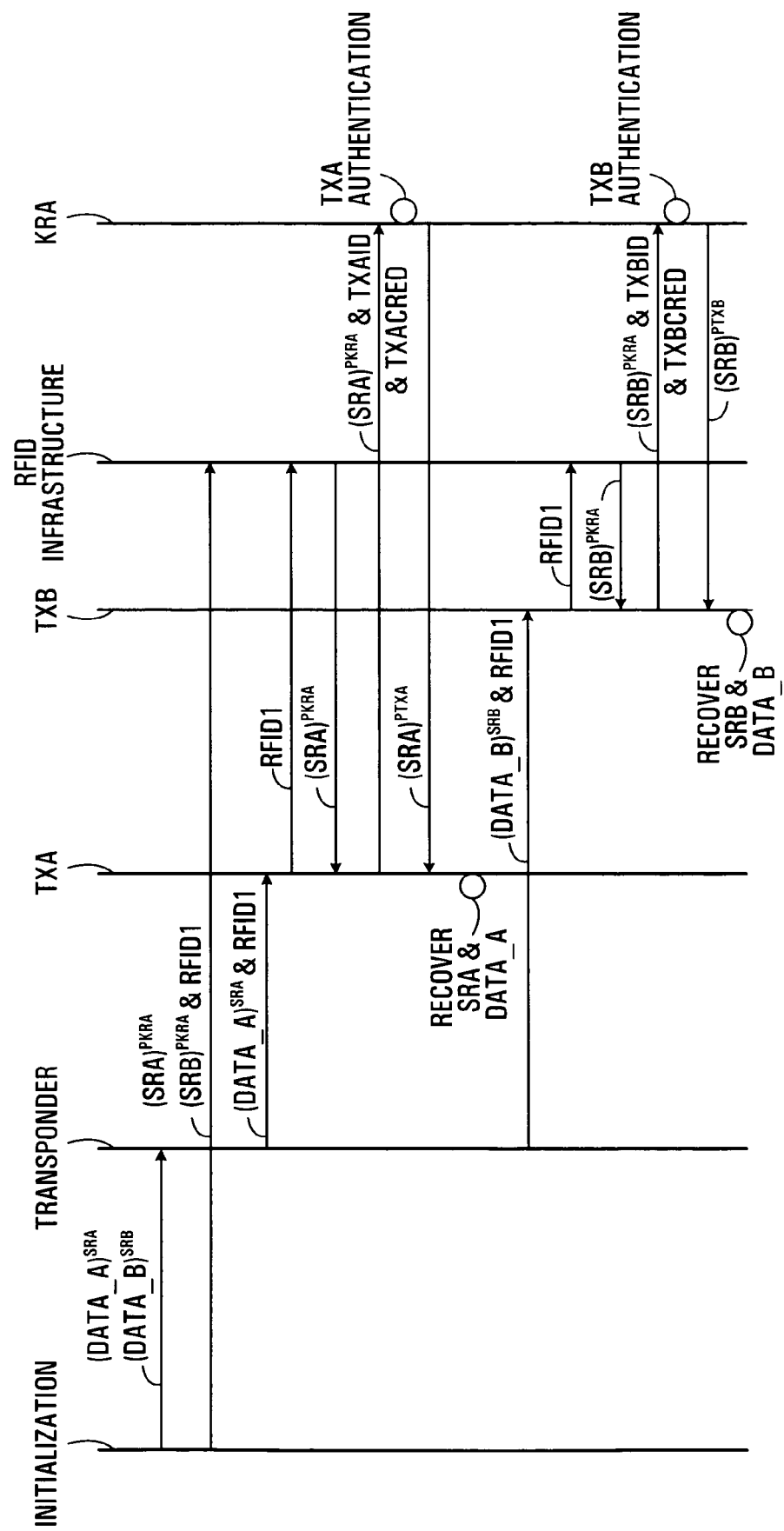
FIG. 7 is a signal flow diagram of a method of transponder information security in a multi-domain RFID system according to an embodiment of the invention utilizing a single KRA.

FIG. 7 is a signal flow diagram of a multi-domain RFID system possessing a single KRA and a single RFID infrastructure database, in which KA is a symmetric key SRA, and KB is a symmetric key SRB. For the purposes of FIG. 7, DOMAIN A will be the first stage encountered by the transponder after its initialization, transceiver TXA will be the last transceiver of DOMAIN A encountered by the transponder before the transponder encounters transceiver TXB. During initialization, DOMAIN A transponder information DATA_A is encrypted with DOMAIN A symmetric key SRA to generate DOMAIN A encrypted transponder information $(DATA\_A)^{SRA}$ and DOMAIN B transponder information DATA_B is encrypted with DOMAIN B symmetric key SRB to generate DOMAIN B encrypted transponder information $(DATA\_B)^{SRB}$. Both $(DATA\_A)^{SRA}$ and $(DATA\_B)^{SRB}$ are stored in the transponder. The RFID infrastructure is initialized with DOMAIN A encrypted symmetric encryption key $(SRA)^{PKRA}$ and DOMAIN B encrypted symmetric encryption key $(SRB)^{PKRA}$ along with the associated RFID, namely RFID1.

When the transponder has a transaction with a transceiver TXA of DOMAIN A, the transponder forwards (DATA_A)$^{SRA}$ and its RFID (RFID1) to transceiver TXA. Transceiver TXA forwards RFID1 to the RFID infrastructure which returns the DOMAIN A encrypted decryption information $(SRA)^{PKRA}$ to transceiver TXA. Transceiver TXA then forwards $(SRA)^{PKRA}$, along with its identification TXAID and its credentials TXACRED to the KRA. The KRA performs authentication on TXA, and if TXA is authenticated, the KRA decrypts $(SRA)^{PKRA}$ to recover SRA, and then encrypts SRA with TXAs public key PTXA generating DOMAIN A transceiver encrypted decryption information $(SRA)^{PTXA}$. Using its private key, TXA recovers the symmetric key SRA and decrypts $(DATA\_A)^{SRA}$ to recover the transponder information pertaining to DOMAIN A, namely DATA_A.

Transponder TXA with application XA performs the necessary actions to complete the transaction. As with other embodiments described above, if transponder data is updated, it is encrypted and stored with an appropriate key, and the RFID infrastructure is updated accordingly. In the example transaction shown in FIG. 7, no update to DATA_A is performed.

Now that the transponder has completed the transaction at transceiver TXA, and the last transaction within DOMAIN A is complete, the transponder transacts with the first transceiver of DOMAIN B, namely transceiver TXB. The transponder sends $(DATA\_B)^{SRB}$ and its RFID (RFID1) to transceiver TXB, which forwards them to the RFID infrastructure. The RFID infrastructure returns the encrypted decryption information $(SRB)^{PKRA}$ for recovering DATA_B to TXB. Transceiver TXB then forwards $(SRB)^{PKRA}$, its identification TXBID and its credentials TXBCRED to the KRA. The KRA authenticates TXB and returns a PTXB public key of TXB encrypted symmetric key SRB for transceiver TXB to recover SRB and subsequently recover DATA_B by decryption. As with the particular information of DOMAIN A, no example modifications to the data DATA_B of DOMAIN B are illustrated, but in a similar manner to that discussed in association with other embodiments, if the data were modified, it would be encrypted and stored in the transponder, and the decryption information (the decryption key which here would be symmetric) would be encrypted with the public key PKRA of the KRA and forwarded to the RFID infrastructure along with RFID1 for storage. Authorization may also be performed.

In some embodiments, the RFID does not have the ability to prevent the forwarding of $(DATA\_A)^{SRA}$ to TXB. In this case the use of encryption prevents TXB from seeing domain A data.

FIG. 8 illustrates an embodiment of a multi-domain RFID system according to the invention in which a multi-domain RFID infrastructure includes separate infrastructure databases 555A and 555B for DOMAINS A and B respectively and separate key release agents KRA_A 570A and KRA_B 570B for DOMAINS A and B respectively.

In this embodiment RFID infrastructure database 555A stores the encryption information KA for decrypting $(DATA\_A)^{KA}$ stored on transponder 510. The decryption information moreover is itself encrypted with the public key of KRA_A 570A, namely PKRA_A, and is stored in associated with the RFID of trasponder1 namely RFID1. The key release agent of DOMAIN A KRA_A 570A stores security and authentication information 575A including transceiver identification TXAID, authentication information TXA_AUTH, the public key of TXA namely KTXA, and policy service rules for controlling how TXA may access, modify, or add to transponder data.

In an analogous manner, the RFID infrastructure database 555B and KRA, KRA_B 570B have security, identification, and authentication information to enable TXB 530 to recover DATA_B from $(DATA\_B)^{KB}$ stored on transponder1 510.

Once transceiver TXA 520 has access to DATA_A it performs the transaction using application XA 522, and subsequently once transceiver TXB 530 has access to DATA_B it performs its transaction using application XB 532.

Referring now to FIG. 9, an example set of policy service rules for transceivers, TXA, TXB, and TXC with respect to transponder information, DATA_A, DATA_B, and DATA_C, will now be described.

It should be understood that this table illustrates but one example set of rules that could be utilized in a multi-domain RFID system, a particular set of rules created for a particular multi-domain RFID system will in general depend upon how the system is structured and implemented.

In the example shown in FIG. 9, TXA has read, write, modify, and append privileges with respect to DATA_A but has not been granted permission to handle either DATA_B or DATA_C. Transceiver TXB has permission to read, write, modify, and append DATA_B, but has permission only to read and append DATA_A. Transceiver TXB has no permission to do anything with DATA_C. Transceiver TXC has no permission to do anything with DATA_A or DATA_B, but has read, write, modify, and append permission with respect to DATA_C.

It is to be understood that the authorized transceivers TXA, TXB, and TXC are secure and also will dutifully enforce the rules forwarded to them by the respective key release agent. Such a system with policy rules can provide for controlled inter-domain data exchange or modification, or enforce rules which ensure no inter-domain data exchange or modification. In some embodiments hardware in the transceivers enforces the rules, and limits the applications from performing restricted activities. In addition to the use of "trusted" transceivers the rules may also be enforced on the RFID transponder by having it require pass codes to unlock a capability/function, i.e. a specific pass code may need to be transmitted to unlock write for DATA_A which is different from the code DATA_B. These codes may be stored in the RFID infrastructure as extra data encrypted for the KRA and the KRA would re-encrypt and provide to the transceivers based on the rules. This can also be considered an example of an authorization mechanism.

Figure 10:
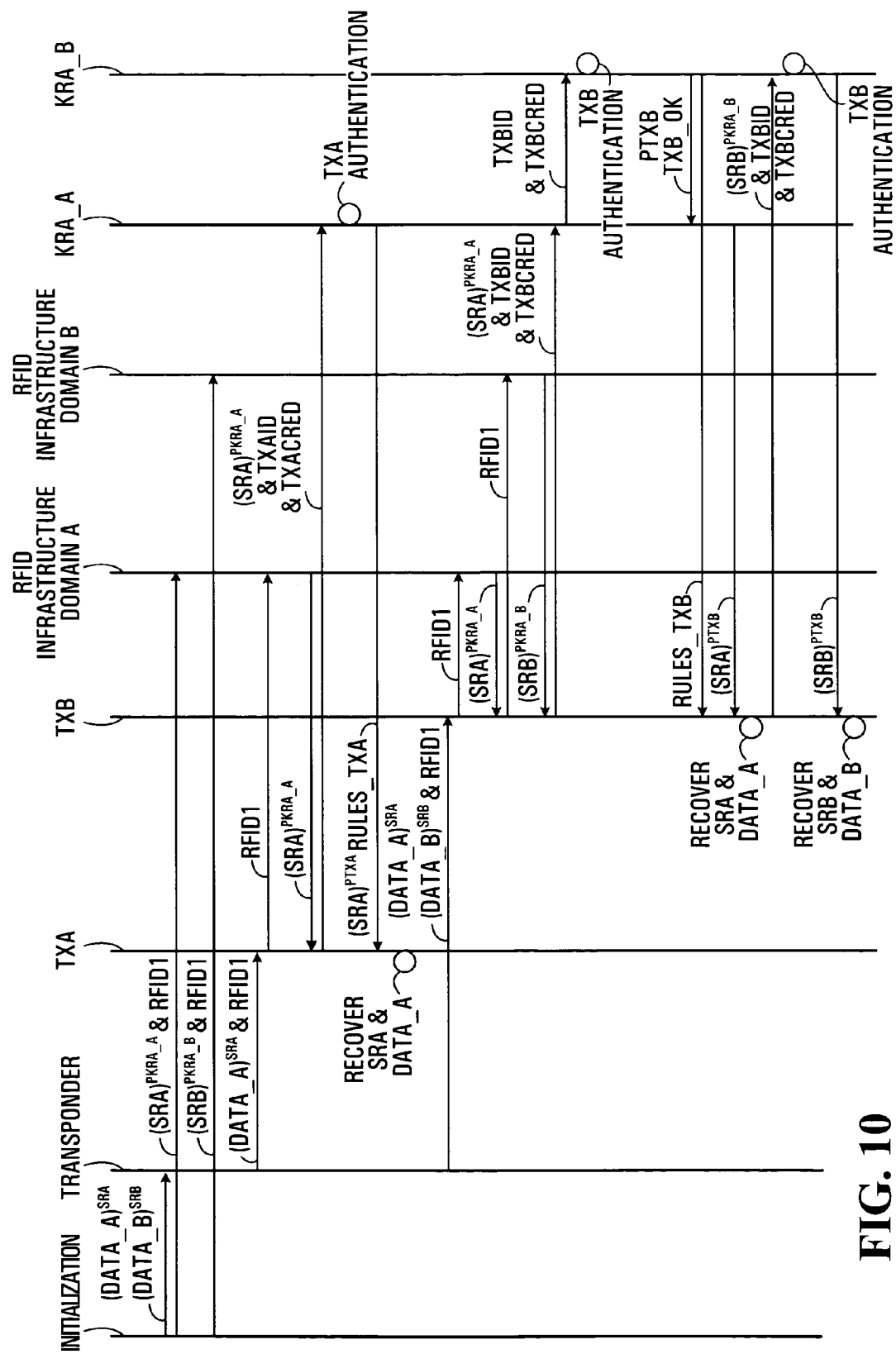
FIG. 10 is a signal flow diagram of a method of transponder information security in a multi-domain RFID system according to an embodiment of the invention utilizing multiple KRA's and policy service rules to restrict transceivers access to transponder data.

Referring to FIG. 10, a multi-domain RFID system with separate RFID infrastructure databases and KRAs will now be described in terms of signal flow and function.

During initialization, DATA_A is encrypted with symmetric key SRA and stored on transponder1, and DATA_B is encrypted with symmetric key SRB and stored on transponder1. Also during initialization, the symmetric key SRA is encrypted with public key PKRA_A and sent to the RFID infrastructure for DOMAIN A along with RFID1 and symmetric key SRB is encrypted with public key PKRA_B and sent to the RFID infrastructure of DOMAIN B along with RFID1.

The transponder first has a transaction with transceiver TXA, and forwards $(DATA\_A)^{SRA}$ along with its RFID (RFID1) to transceiver TXA. Transceiver TXA then forwards RFID1 to the RFID infrastructure of DOMAIN A, which returns to transceiver TXA an encrypted version of SRA, namely $(SRA)^{PKRA\_A}$ where PKRA_A is a public key of KRA_A the KRA of DOMAIN A. Transceiver TXA sends $(SRA)^{PKRA\_A}$ along with its identifier TXAID and its credentials TXACRED to the KRA of DOMAIN A, KRA_A. The key release agent of DOMAIN A authenticates transceiver TXA, and returns to transceiver TXA policy rules RULES_TXA and the symmetric key SRA encrypted using the public key of transponder TXA, namely PTXA to generate $(SRA)^{PTXA}$.

Transceiver TXA recovers SRA using its private key, and subsequently recovers DATA_A using SRA to decrypt $(DATA\_A)^{SRA}$.

In the particular transaction depicted in FIG. 10, DATA_A of the transponder is not changed during the transaction with transceiver TXA. If the data were changed, a new symmetric key would be generated by TXA to encrypt the new transponder information, and a copy of that new symmetric key would be encrypted using the public key of KRA_A and stored on the RFID infrastructure database for DOMAIN A and associated with the RFID of the transponder.

In this example, the policy rules for TXA are such that TXA does not have permission to access DATA_B or any information other than DATA_A, hence no communication between TXA and RFID infrastructure databases or KRAs of any domain other than DOMAIN A occur. It also should be noted that RULES_TXA need not be forwarded to transceiver TXA every time TXA has a transaction, particularly if the RULES_TXA have not changed since they were last transmitted to TXA. RULES_TXA may also contain a pass code to enable some capability on the transponder. RULES_TXA may also be protected for TXA to prevent tampering.

At a later time, the transponder has a transaction with transceiver TXB. Transceiver TXB receives both $(DATA\_A)^{SRA}$ and $(DATA\_B)^{SRB}$ along with the transponder's RFID (namely RFID1). During the transaction transceiver TXB has a set of policy rules that allow access to both DATA_B and DATA_A and consequently an application for example application XB, may request DATA_A and DATA_B. The transponder forwards $(DATA\_A)^{SRA}$, $(DATA\_B)^{SRB}$, and RFID1 to transceiver TXB. Transceiver TXB forwards RFID1 to the RFID infrastructures of DOMAIN A and DOMAIN B, and is returned $(SRA)^{PKRA\_A}$ and $(SRB)^{PKRA\_B}$ respectively. Transceiver TXB forwards $(SRA)^{PKRA\_A}$ and its identification and credentials TXBID and TXBCRED to the KRA of DOMAIN B, KRA_A. In this embodiment KRA_A and KRA_B may communicate securely with each other. Key release agent KRA_B forwards TXBID and TXBCRED to key release agent KRA_A to authenticate TXB. Once TXB is authenticated by KRA_A, KRA_A returns the public key of TXB, namely PTXB, and a response for example TXB_OK to KRA_A to indicate TXB has been successfully authenticated. If RULES_TXB for TXB have changed, since the last time TXB's rules were updated, new RULES_TXB are forwarded to transceiver TXB for enforcement. Now having PTXB, key release agent KRA_A decrypts $(SRA)^{PKRA\_A}$ to obtain SRA, and encrypts SRA into $(SRA)^{PTXB}$, and forwards it to TXB for decryption. Transceiver TXB then recovers SRA and uses SRA to recover DATA_A.

If TXB in Domain B can find the RFID infrastructure A then it will likely be able to find KRA_A and will communicate to KRA_A and DKA_B directly. If not then TXB will only communicate to domain B components and they will either redirect or relay communications to domain A components.

To obtain decryption information to recover DATA_B, transceiver TXB forwards $(SRB)^{PKRA\_B}$ and its transceiver identification TXBID and its credentials TXBCRED to KRA_B. Key release agent KRA_B authenticates TXB, decrypts $(SRB)^{PKRA\_B}$ to obtain SRB, and encrypts SRB with the public key of TXB, namely PTXB, to generate $(SRB)^{PTXB}$, and forwards $(SRB)^{PTXB}$ to TXB. Transceiver TXB then recovers SRB, and uses SRB to recover DATA_B.

In this example transaction, the transponder information DATA_B is not modified and hence not re-encrypted nor stored anew in the transponder or in the RFID infrastructure. In this particular embodiment each RFID infrastructure database only has information with respect to transponders having data related to the same domain as the RFID infrastructure database. Each KRA has authentication information, identifications, and keys only for transceivers in the same domain as the KRA.

Figure 11:
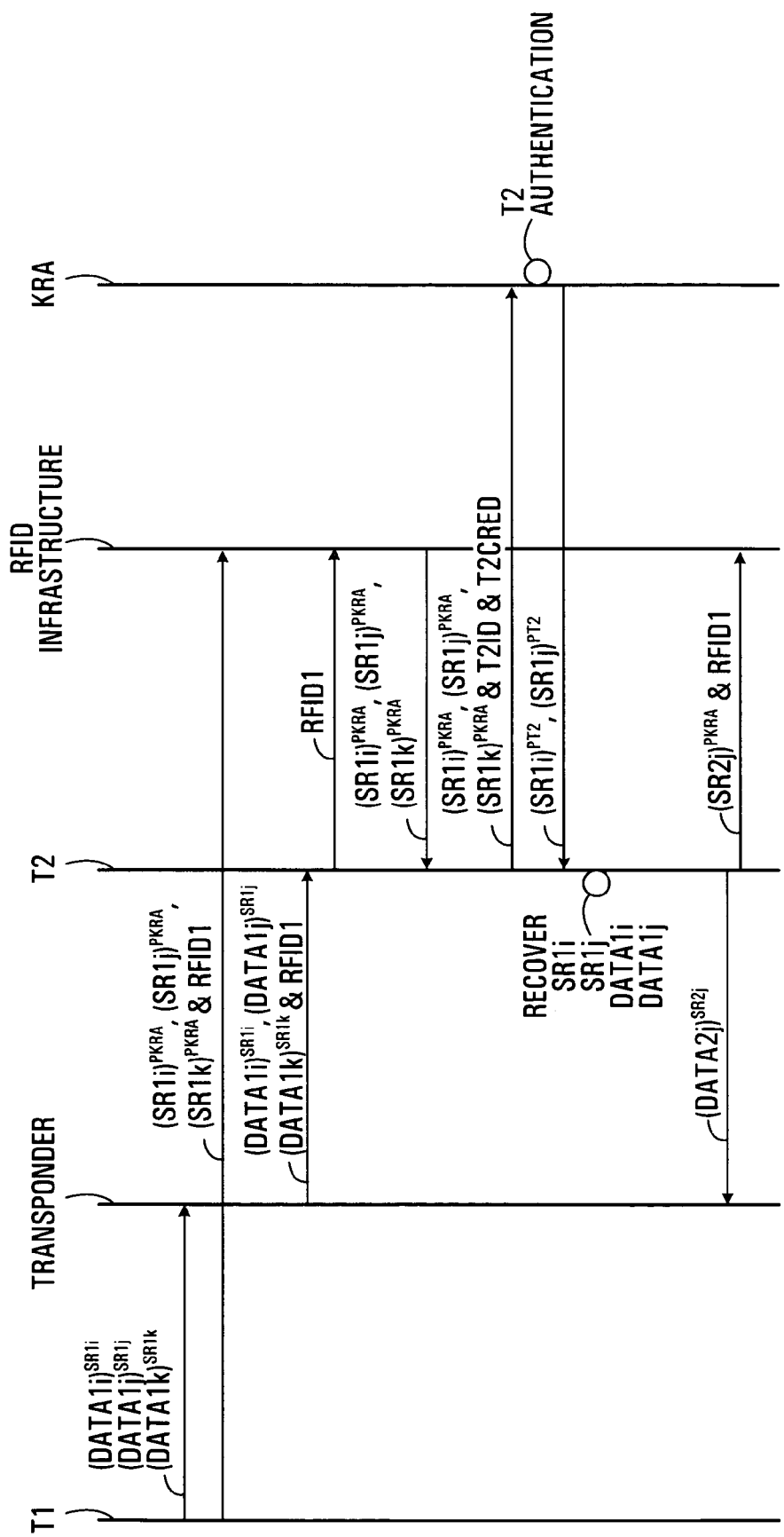
FIG. 11 is a signal flow diagram of a method of multi-level transponder information security according to an embodiment of the invention utilizing multiple-encryption keys.

Referring to FIG. 11, an RFID system with stratified security level data stored on the transponders will now be described in terms of signal flow and function. In this embodiment, the transponder is loaded by transceiver T1 with data of three different security levels in encrypted form (DATA1$i$)$^{SR1i}$, (DATA1$j$)$^{SR1j}$ and (DATA1$k$) SR1$k$ Encrypted versions of the three symmetric keys used to encrypt the data, namely (SR1$i$)$^{PKRA}$, (SR1$j$)$^{PKRA}$, and (SR1$k$)$^{PKRA}$ along with the RFID, RFID1, are forwarded to the RFID infrastructure.

When the transponder transacts with transceiver T2, the transponder sends all of (DATA1$i$)$^{SR1i}$, (DATA1$j$)$^{SR1j}$, (DATA1$k$)$^{SR1k}$ and RFID1 to transceiver T2. Transceiver T2 forwards RFID1 to the RFID infrastructure and receives the encrypted decryption information, (SR1$i$)$^{PKRA}$, (SR1$j$)$^{PKRA}$, and (SR1$k$)$^{PKRA}$. Transceiver T2 then forwards this encrypted decryption information along with its identifier T2ID and its credentials T2CRED to the KRA.

The KRA performs authentication of T2 and in this example finds that transceiver T2 is authorized access to SR1$i$ and SR1$j$ but not SR1$k$. The KRA therefore only returns (SR1$i$)$^{PT2}$ and (SR1$j$)$^{PT2}$ to transceiver T2 using rules or authorization mechanisms as previously mentioned.

Transceiver T2 recovers SR1$i$ and SR1$j$ using its private key and then recovers DATA1$i$ and DATA1$j$ using symmetric keys SR1$i$ and SR1$j$.

In this example transaction, DATA1$i$ is not modified, while DATA1$j$ is modified to DATA2$j$. Transceiver T2 creates new symmetric key SR2$j$ and encrypts DATA2$j$ using key SR2$j$ subsequently storing the new encrypted transponder information (DATA2$j$)$^{SR2j}$ on the transponder. Transceiver T2 encrypts symmetric key (SR2$j$) into (SR2$j$)$^{PKRA}$ using the KRA's public key and forwards (SR2$j$)$^{PKRA}$ and RFID1 to the RFID infrastructure for storage.

Figure 12:
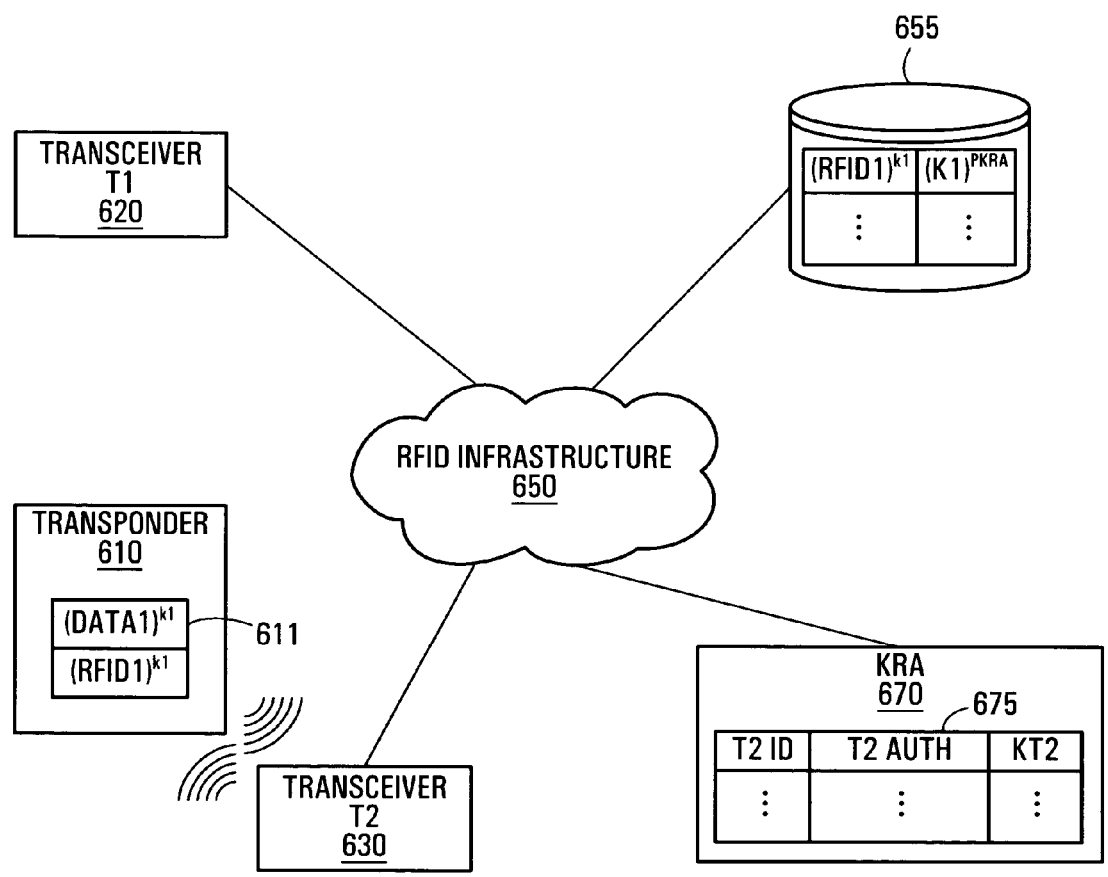
FIG. 12 is a block diagram of an RFID system according to an embodiment of the invention in which an encrypted RFID serves as a metaID.

In some embodiments of an RFID system according to the invention, the RFID is stored in the transponder in encrypted form and the encrypted RFID acts as a metaID. An example of such an embodiment is illustrated in FIG. 12. Shown are two transceivers T1 620 and T2 630. RFID infrastructure 650 and RFID infrastructure database 655 and key release agent 670 are also shown. The transponder 610 has stored in its data store 611, an RFID namely RFID1 encrypted into (RFID1)$^{k1}$ which serves as a metaID.

The RFID infrastructure database 655 has an encrypted version of the decryption information, (K1)$^{PKRA}$ associated with the metaID, (RFID1)$^{k1}$ of transponder. The (RFID1)$^{k1}$ metaID serves to index the encrypted decryption information in the RFID infrastructure database and is associated with the transponder to which the encrypted decryption information pertains. In this embodiment, although the "true" RFID is not transmitted over the air, the RFID is recoverable by transceiver T2 630 if T2 is authorized by the KRA 670.

Figure 13:
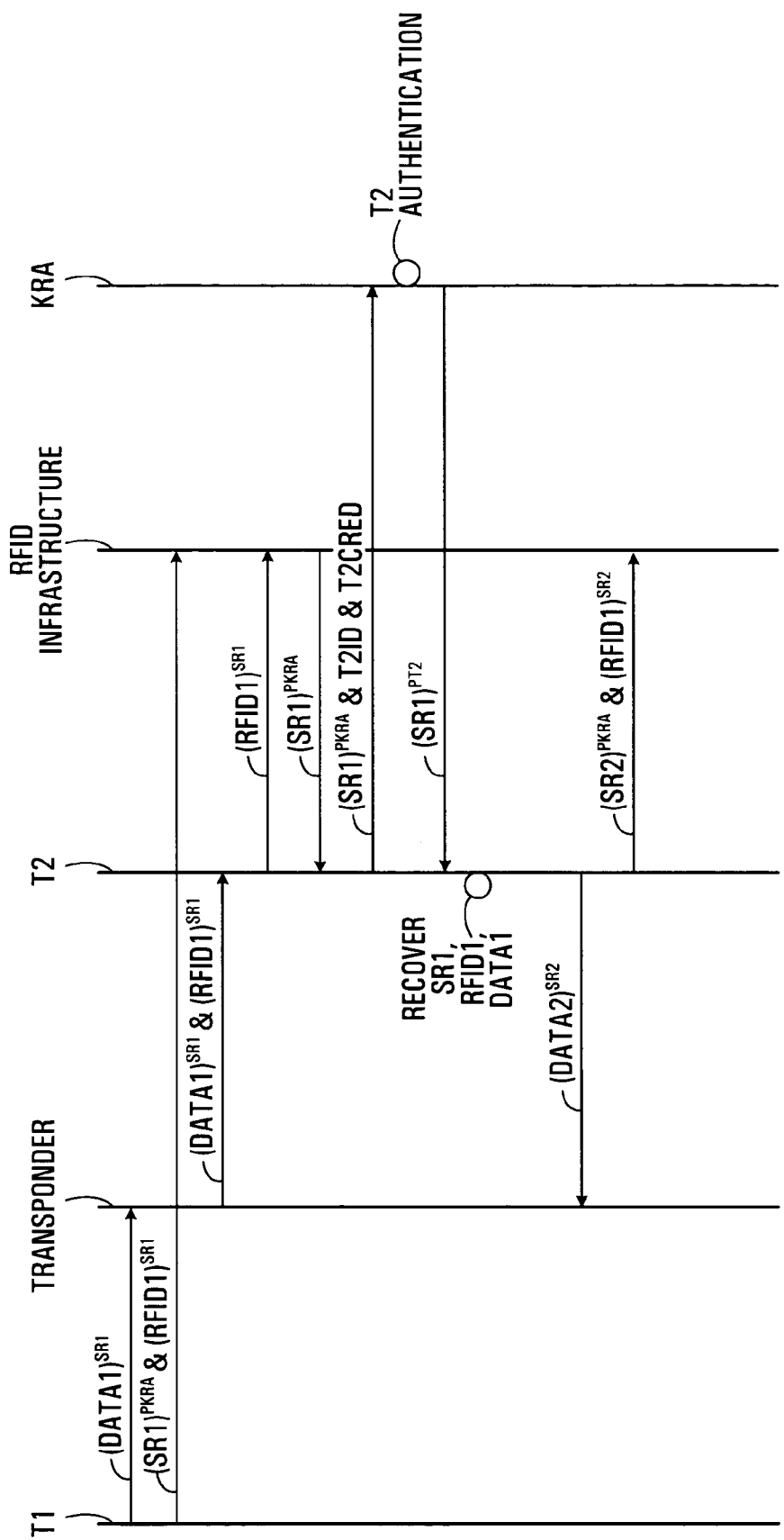
FIG. 13 is a signal flow diagram of a method of transponder information security according to an embodiment of the invention in which an encrypted RFID serves as a metaID.

Referring to FIG. 13, an RFID system utilizing encrypted RFIDs according to an embodiment of the invention will now be discussed.

In this example, the transponder has been loaded with (DATA1)$^{SR1}$ by transceiver T1, and the RFID infrastructure database has been loaded with (SR1)$^{PKRA}$ and a symmetric key encrypted RFID, (RFID1)$^{SR1}$.

During a transaction between the transponder and transceiver T2, (DATA1)$^{SR1}$ and (RFID1)$^{SR1}$ are forwarded from the transponder to the transceiver T2. The transceiver T2 forwards the metaID, namely (RFID1)$^{SR1}$ to the RFID infrastructure. The RFID infrastructure uses the metaID to retrieve (SR1)$^{PKRA}$ from its database after which it forwards (SR1)$^{PKRA}$ to T2. Transceiver T2 then forwards (SR1)$^{PKRA}$ and T2ID and T2CRED to the KRA for authentication and receipt of (SR1)$^{PT2}$ once T2 is authenticated. Transceiver T2 recovers SR1 with its private key and then recovers RFID1 and DATA1 using symmetric key SR1.

If data of the transponder is modified to DATA2 during the transaction, T2 generates new symmetric key SR2, encrypts DATA2 to obtain (DATA2)$^{SR2}$, and forwards (DATA2)$^{SR2}$ to the transponder for storage. Transponder T2 also encrypts RFID1 with the symmetric key SR2 to obtain (RFID1)$^{SR2}$ and forwards it along with a KRA public key encrypted version of the symmetric key, namely (SR2)$^{PKRA}$, to the RFID infrastructure.

In some embodiments, the decryption information recovered by the transacting transceiver is not itself an encryption key per se. As discussed in associated with FIG. 1, the information stored on the transponder may be encrypted with a key which was generated in a specific manner. The decryption information therefore need only provide parameters which the transceiver requires to generate a decryption key. In some embodiments the actual encryption and decryption keys may be different. In the specific implementation of the Diffie-Hellmann (DH) symmetric key derivation discussed above, the common generation formula K=a$^{xy}$modp is known to all transceivers before hand, as well as some of a, x, y, and p which have been assigned to be constants, and the remaining of a, x, y, and p which have been assigned as decryption information to be randomly generated by a transceiver for storing the encrypted data. These randomly generated parameters are stored as decryption information and will be recovered by a subsequent transceiver to generate the decryption key to decrypt the encrypted transponder information.

Figure 14:
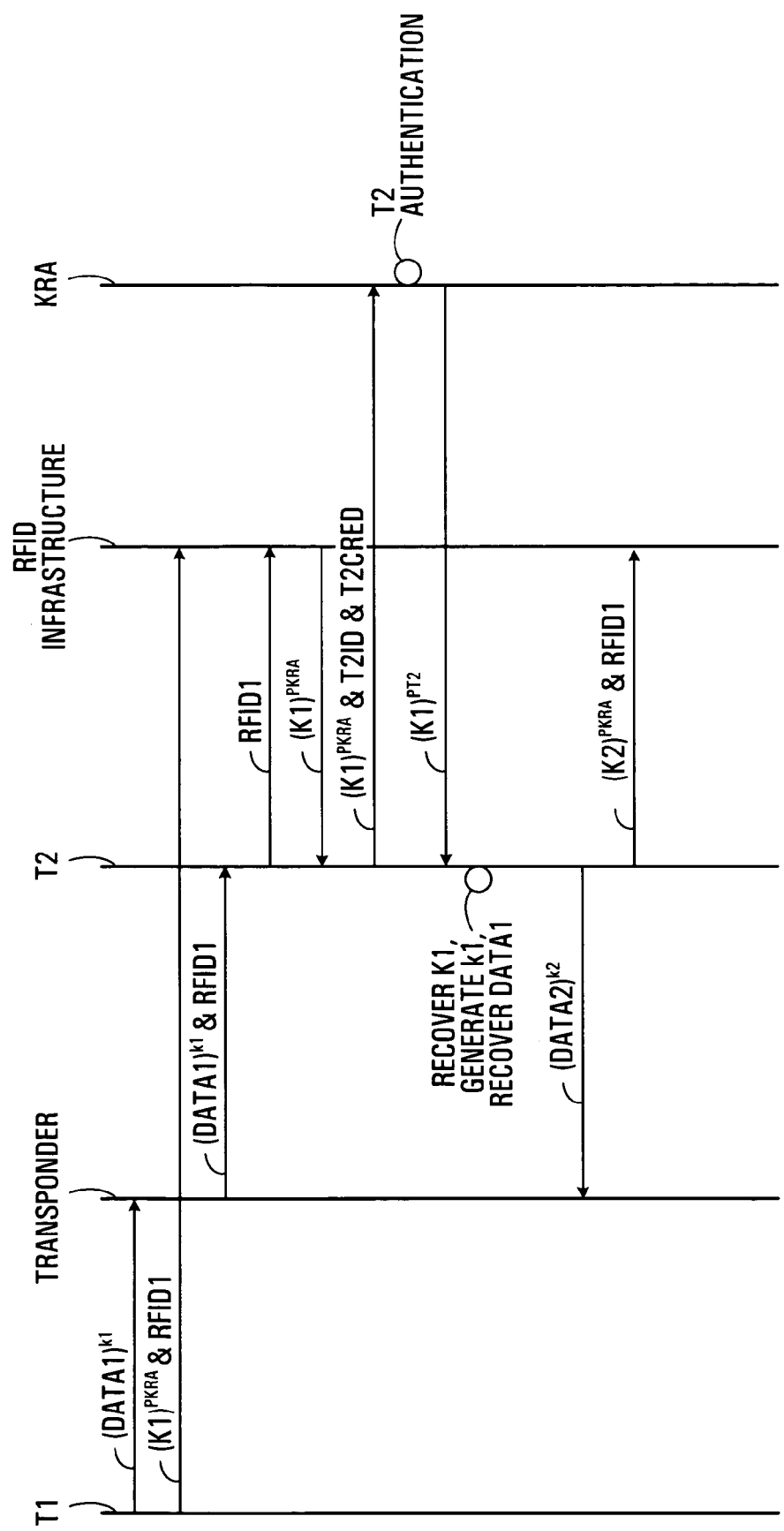
FIG. 14 is a signal flow diagram of a method of transponder information security according to an embodiment of the invention in which description information is used to generate a key.

Referring to FIG. 14 the specific implementation of DH derivation in an embodiment of the invention will now be discussed.

During a transaction with the transponder, transceiver T1 generates key k1 according to DH derivation by randomly selecting the values of the variable parameters of the DH derivation and using them with the preset constants.

Transponder data DATA1 is encrypted using k1 and stored on the transponder. The variable parameters required to generate the key k1, also referred to as the decryption information, K1 is encrypted using the public key of the KRA, namely PKRA. This encrypted decryption information (K1)$^{PKRA}$ is forwarded along with the RFID of the transponder, RFID1, to the RFID infrastructure. The RFID infrastructure stores (K1)$^{PKRA}$ and the associated RFID1.

The transponder has its next transaction with transceiver T2. During the transaction the transponder forwards (DATA1)$^{k1}$ and RFID1 to T2. Transceiver T2 forwards RFID1 to the RFID infrastructure to request the encrypted decryption information. The RFID infrastructure returns the encrypted decryption information (K1)$^{PKRA}$ associated with RFID1. Transceiver T2 then forwards (K1)$^{PKRA}$ and its identification T2ID and credentials T2CRED to the KRA. The KRA performs authentication on T2. If T2 is authenticated, the KRA returns the decryption information K1, encrypted with PT2 to transceiver T2. Transceiver T2 uses its private key to decrypt (K1)$^{PT2}$ to recover K1, and uses the variable parameter(s) of K1 and the constants(s) to generate k1 using DH key derivation. Transceiver T2 then uses k1 to recover DATA1 from (DATA1)$^{k1}$. The transponder information DATA1 may then be used in the transaction. If the transponder information changes during the transaction into DATA2, T2 generates new key k2 and encrypts DATA2 with k2 before storing on the transponder. Transceiver T2 also updates the RFID infrastructure database with an encrypted version of the new decryption information K2 needed to generate key k2 to decrypt (DATA2)$^{k2}$. This new encrypted decryption information (K2)$^{PKRA}$ is associated with RFID1 in the RFID infrastructure database.

Numerous modifications and variations of the present invention are possible in light of the above teachings. It is therefore to be understood that within the scope of the appended claims, the invention may be practiced otherwise than as specifically described herein.

I claim:

1. A method in a transceiver comprising:
   reading an identifier of a transponder from the transponder;
   transmitting to a datastore the identifier as a query to access data associated with the transponder;
   receiving as a response to the query, the data;
   reading encrypted information from the transponder;
   transmitting to an authentication authority a request to access the encrypted information;
   wherein the request comprises authentication credentials for authenticating the transceiver and wherein the request further comprises the data.

2. The method of claim 1 wherein the request further comprises authorization data for authorizing the transceiver.

3. The method of claim 1 further comprising:
   receiving as a response to the request, decryption information for use in decrypting the encrypted information to recover the information.

4. The method of claim 3 wherein the decryption information is encrypted so as to be decryptable by the transceiver.

5. The method of claim 4 further comprising:
   decrypting the encrypted decryption information; and
   decrypting the encrypted information with use of the decryption information, to recover the information.

6. The method of claim 5 wherein the decryption information is a decryption key.

7. The method of claim 4 wherein the decryption information is encrypted with a public key corresponding to a private key of the transceiver.

8. The method of claim 6 wherein the decryption key is a symmetric key, and the encrypted information comprises the information encrypted with the symmetric key.

9. The method of claim 6 wherein the decryption key is a private key corresponding to a public key of the transponder, and the encrypted information comprises the information encrypted with the symmetric key.

10. The method of claim 5 further comprising:
    encrypting new information to generate encrypted new information; and
    storing the encrypted new information on the transponder.

11. The method of claim 10 further comprising:
    storing new data in the datastore.

12. The method of claim 11 wherein the new data comprises encrypted new decryption information for use in decryption of the encrypted new information.

13. The method of claim 12 further comprising:
    encrypting the new decryption information with a public key of the authenticating authority.

14. The method of claim 10 wherein the new information is encrypted with a new key.

15. The method of claim 14 wherein the new key is generated by the transceiver.

16. The method of claim 15 wherein the new key is a new symmetric key.

17. The method of claim 10 wherein the encrypted new information is stored in the datastore in association with the RFID of the transponder.

18. The method of claim 5 wherein the decryption information is information for generation of a decryption key, wherein the step of decrypting the encrypted information with use of the decryption information comprises:
    generating the decryption key using the decryption information;
    decrypting the encrypted information using the decryption key to recover the information.

19. The method of claim 1 wherein the data associated with the transponder is for use in decrypting the encrypted information.

20. The method of claim 1 wherein the data comprises encrypted decryption information, the decryption information for use in decrypting the encrypted information.

21. The method of claim 1 wherein the data is encrypted using a public key corresponding to a private key of the authenticating authority.

22. The method of claim 21 wherein the authenticating authority is a key release agent (KRA).

23. The method of claim 1 wherein the datastore is an RFID infrastructure database.

24. The method of claim 23 wherein the datastore and the authenticating authority are part of an RFID infrastructure.

25. The method of claim 1,
    wherein the data is encrypted decryption information, the decryption information for use in decrypting the encrypted information to recover the information; and
    after transmitting the request:
    receiving as a response to the request, the decryption information re-encrypted, wherein the decryption information is decryptable by the transceiver.

26. The method of claim 25 wherein the decryption information is a symmetric key encrypted with a public key corresponding to a private key of the transceiver, the method further comprising after receiving the re-encrypted decryption information:
    decrypting the re-encrypted decryption information to recover the symmetric key; and
    decrypting the encrypted information with use of the symmetric key, to recover the information.

27. The method of claim 26 wherein the query is transmitted to an RFID infrastructure database of an RFID infrastructure, and wherein the data received in response to the query is encrypted with a public key corresponding to a private key of a key release agent (KRA) of the RFID infrastructure, and wherein the request is transmitted to the KRA.

28. The method of claim 1 wherein the request further comprises the encrypted information.

29. The method of claim 28 further comprising:
    receiving as a response to the request, the information re-encrypted in a manner decryptable by the transceiver.

30. The method of claim 29 wherein the encrypted information is encrypted with a public key of an authenticating authority of an infrastructure, and wherein the request is transmitted to the authenticating authority.

31. The method of claim 30 wherein the re-encrypted information is encrypted with a public key corresponding to a private key of the transceiver, the method further comprising after receiving the re-encrypted information:
    decrypting the re-encrypted information to recover the information.

32. The method of claim 31 wherein the information comprises data pertaining to the transponder.

33. The method of claim 31 wherein the information is an identifier of the transponder.

34. The method of claim 1, wherein:
    reading an identifier comprises reading an encrypted identifier of the transponder from the transponder; and
    transmitting the identifier comprises transmitting the encrypted identifier as a query to access data associated with the transponder.

35. The method of claim 34 wherein the data associated with the transponder comprises encrypted decryption information, the decryption information for use in decrypting the encrypted information and for use in decrypting the encrypted identifier.

36. The method of claim 35 wherein the data is encrypted with a public key corresponding to a private key of an authenticating authority of an infrastructure, and wherein the request is transmitted to the authenticating authority.

37. The method of claim 36 wherein the query is sent to a datastore of the infrastructure.

38. The method of claim 1 wherein the transceiver is of a specific domain of a multi-domain system, the method further comprising:
receiving as a response to the request, decryption information for use in decrypting a portion of the encrypted information corresponding to the domain of the transceiver, to recover a portion of the information corresponding to the domain.

39. The method of claim 1 wherein the authentication credentials for authenticating the transceiver are further for authorizing a data security level of data the transceiver is allowed access, the method further comprising:
receiving in response to the request, decryption information for use in decrypting a portion of the encrypted information having the data security level the transceiver is authorized to access.

40. A method in a transceiver comprising:
reading encrypted information from a transponder;
transmitting a request to access the encrypted information;
wherein the request comprises authentication credentials for authenticating the transceiver;
wherein the transceiver is of a specific domain of a multi-domain system, and wherein the authentication credentials for authenticating the transceiver are further for authorizing the transceiver to access data of a domain other than the specific domain, the method further comprising:
receiving as a response to the request, decryption information for use in decrypting a portion of the encrypted information corresponding to the domain of the transceiver, to recover a portion of the information corresponding to the domain, and policy rule information specifying which if any domain the transceiver is authorized access to other than the specific domain.

41. The method of claim 40 wherein the request is transmitted to an authenticating authority of the specific domain, the method further comprising:
transmitting a request to access a portion of the encrypted information corresponding to a domain other than the specific domain, wherein the request comprises the authentication credentials of the transponder.

42. A method in a transceiver comprising:
reading encrypted information from a transponder;
transmitting a request to access the encrypted information;
wherein the request comprises authentication credentials for authenticating the transceiver;
further comprising:
to access a particular capability/function, the transceiver employing a passcode needed to unlock this capability/function;
wherein to obtain the passcode to unlock a capability/function, the transceiver requests the passcode from an RFID infrastructure, and the transceiver receives the passcode from the RFID infrastructure if a set of one or more defined rules are satisfied.

43. A method in an authenticating authority comprising:
receiving a request from a transceiver for access to encrypted information of a transponder, the request comprising authentication credentials;
authenticating the transceiver with use of the authentication credentials;
wherein the authenticating authority is of a specific domain of a multi-domain system, and wherein the authentication credentials for authenticating the transceiver are further for authorizing the transceiver to access data of the specific domain, the method further comprising:
transmitting to the transceiver as a response to the request, decryption information for use in decrypting a portion of the encrypted information corresponding to the specific domain, to recover a portion of the information corresponding to the specific domain
the method further comprising:
if the transceiver is of the same domain as the authenticating authority:
transmitting to the transceiver further in response to the request, policy rule information specifying which if any domain the transceiver is authorized access to other than the specific domain.

44. A transceiver configured to:
read an identifier of a transponder from the transponder;
transmit to a datastore the identifier as a query to access data associated with the transponder;
receive as a response to the query, the data;
read encrypted information from the transponder;
transmit to an authentication authority a request to access the encrypted information;
wherein the request comprises authentication credentials for authenticating the transceiver and wherein the request further comprises the data.

45. A computer readable medium having computer readable instructions stored thereon for execution by one or more computers for reading and accessing encrypted information from a transponder, said computer readable instructions comprising:
computer readable instructions for reading an identifier of a transponder from the transponder;
computer readable instructions for transmitting to a datastore the identifier as a query to access data associated with the transponder;
computer readable instructions for receiving as a response to the query, the data;
computer readable instructions for reading encrypted information from the transponder;
computer readable instructions for transmitting to an authentication authority a request to access the encrypted information;
wherein the request comprises authentication credentials for authenticating the transceiver and wherein the request further comprises the data.

* * * * *